US011954245B2

(12) United States Patent
Pla I. Conesa et al.

(10) Patent No.: US 11,954,245 B2
(45) Date of Patent: Apr. 9, 2024

(54) DISPLAYING PHYSICAL INPUT DEVICES AS VIRTUAL OBJECTS

(71) Applicant: Apple Inc., Cupertino, CA (US)

(72) Inventors: Pol Pla I. Conesa, San Francisco, CA (US); Earl M. Olson, Vancouver (CA); Aaron P. Thompson, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/985,040

(22) Filed: Nov. 10, 2022

(65) Prior Publication Data

US 2023/0273674 A1 Aug. 31, 2023

Related U.S. Application Data

(63) Continuation of application No. 16/410,547, filed on May 13, 2019, now Pat. No. 11,500,452.

(Continued)

(51) Int. Cl.
*G06F 3/01* (2006.01)
*G06F 3/023* (2006.01)
*G06F 3/0354* (2013.01)

(52) U.S. Cl.
CPC ............ *G06F 3/011* (2013.01); *G06F 3/016* (2013.01); *G06F 3/023* (2013.01); *G06F 3/03547* (2013.01)

(58) Field of Classification Search
CPC .......... G06F 3/011; G06F 3/016; G06F 3/023; G06F 3/03547
See application file for complete search history.

(56) References Cited

U.S. PATENT DOCUMENTS 11,045,725 B1 6/2021 Sawyer et al.
2010/0141770 A1 6/2010 Gomi
(Continued)

FOREIGN PATENT DOCUMENTS

CN 104620212 A 5/2015
CN 105377117 A 3/2016
(Continued)

OTHER PUBLICATIONS

Advisory Action received for U.S. Appl. No. 16/410,547, dated May 24, 2021, 5 pages.
(Continued)

*Primary Examiner* — Patrick N Edouard
*Assistant Examiner* — Eboni N Giles
(74) *Attorney, Agent, or Firm* — DLA Piper LLP (US)

(57) ABSTRACT

The present disclosure relates to techniques for displaying representations of physical input devices and overlaying visual features on the representations of physical input devices in a computer-generated reality (CGR) environment. The techniques include displaying a virtual application in a CGR environment and, in response to detecting an input field in the displayed virtual application, displaying at least a portion of the displayed application on a representation of a physical input device. The at least a portion of the displayed application includes the detected input field. In response to detecting an input received at the physical input device, the input field is updated with the input, and the updated input field is displayed.

18 Claims, 12 Drawing Sheets

Related U.S. Application Data

(60) Provisional application No. 62/680,819, filed on Jun. 5, 2018.

(56) References Cited

U.S. PATENT DOCUMENTS

| | | | |
|---|---|---|---|
| 2010/0177035 | A1 | 7/2010 | Schowengerdt et al. |
| 2011/0063224 | A1 | 3/2011 | Vexo et al. |
| 2011/0130159 | A1 | 6/2011 | Chen et al. |
| 2012/0038667 | A1 | 2/2012 | Branson et al. |
| 2013/0194188 | A1 | 8/2013 | Walker et al. |
| 2014/0191977 | A1 | 7/2014 | Feng et al. |
| 2014/0293079 | A1 | 10/2014 | Milanfar et al. |
| 2014/0362110 | A1 | 12/2014 | Stafford |
| 2015/0227222 | A1 | 8/2015 | Sako et al. |
| 2015/0242414 | A1 | 8/2015 | Starner et al. |
| 2015/0258431 | A1 | 9/2015 | Stafford et al. |
| 2016/0117860 | A1 | 4/2016 | Fei et al. |
| 2016/0231862 | A1 | 8/2016 | Tretter et al. |
| 2017/0076502 | A1* | 3/2017 | Chen .................. G06F 3/04886 |
| 2017/0262045 | A1 | 9/2017 | Rouvinez et al. |
| 2017/0300116 | A1* | 10/2017 | Lyons .................... G06F 3/016 |
| 2017/0308258 | A1 | 10/2017 | Xu et al. |
| 2018/0004312 | A1 | 1/2018 | Lee et al. |
| 2018/0136721 | A1 | 5/2018 | Alleaume et al. |
| 2018/0261067 | A1 | 9/2018 | Bostick et al. |
| 2018/0364853 | A1 | 12/2018 | Pahud et al. |
| 2019/0019032 | A1 | 1/2019 | Bostick et al. |
| 2019/0050132 | A1 | 2/2019 | Rawlings et al. |
| 2019/0141181 | A1 | 5/2019 | Wantland |
| 2019/0369714 | A1 | 12/2019 | Pla I. Conesa et al. |
| 2020/0104025 | A1 | 4/2020 | Iglesias et al. |
| 2021/0004133 | A1 | 1/2021 | Iglesias et al. |

FOREIGN PATENT DOCUMENTS

| | | | |
|---|---|---|---|
| CN | 106062862 | A | 10/2016 |
| CN | 108073280 | A | 5/2018 |
| EP | 3264229 | A1 | 1/2018 |
| JP | 2010-136223 | A | 6/2010 |
| KR | 10-2017-0130602 | A | 11/2017 |
| KR | 10-2018-0002208 | A | 1/2018 |
| KR | 10-2018-0025402 | A | 3/2018 |
| WO | 2017/048519 | A1 | 3/2017 |
| WO | 2018/090060 | A1 | 5/2018 |

OTHER PUBLICATIONS

Applicant-Initiated Interview Summary received for U.S. Appl. No. 16/410,547, dated Dec. 13, 2021, 3 pages.
Berman et al., "Sensors for Gesture Recognition Systems", IEEE Transactions on Systems, Man, And Cybernetics, Part C, Applications and Reviews, vol. 42, No. 3, May 2012, pp. 277-290.
Chakraborty et al., "Interactive Touch Screen using Augmented Reality", 4th International Conference on Applied and Theoretical Computing and Communication Technology, 2018, pp. 294-298.
Chan et al., "Real-time Tracking of Hand Gestures for Interactive Game Design", IEEE International Symposium on Industrial Electronics, Jul. 2009, pp. 98-103.
Decision to Grant received for Japanese Patent Application No. 2020-565377, dated Jan. 26, 2022, 3 pages.
Final Office Action received for U.S. Appl. No. 16/410,547, dated Feb. 18, 2021, 39 pages.
International Preliminary Report on Patentability received for PCT Patent Application No. PCT/US2019/033253, dated Dec. 17, 2020, 12 pages.
International Search Report and Written Opinion received for PCT Patent Application No. PCT/US2019/033253, dated Aug. 9, 2019, 16 pages.
Non-Final Office Action received for U.S. Appl. No. 16/410,547, dated Jul. 22, 2021, 47 pages.
Non-Final Office Action received for U.S. Appl. No. 16/410,547, dated Jun. 29, 2020, 34 pages.
Non-Final Office Action received for U.S. Appl. No. 17/028,298, dated Mar. 4, 2021, 9 pages.
Notice of Allowance received for Chinese Patent Application No. 201910815262.6, dated Jan. 14, 2022, 2 pages.
Notice of Allowance received for Korean Patent Application No. 10-2020-7033785, dated Jul. 21, 2022, 5 pages.
Notice of Allowance received for U.S. Appl. No. 17/028,298, dated Jul. 8, 2021, 10 pages.
Notice of Allowance received for U.S. Appl. No. 16/410,547, dated Jul. 15, 2022, 11 pages.
Notice of Allowance received for U.S. Appl. No. 16/410,547, dated Mar. 31, 2022, 11 pages.
Notice of Allowance received for U.S. Appl. No. 16/554,432, dated Jul. 1, 2020, 9 pages.
Notice of Allowance received for U.S. Appl. No. 17/028,298, dated Jun. 8, 2022, 11 pages.
Office Action received for Chinese Patent Application No. 201910815262.6, dated Aug. 27, 2021, 10 pages.
Office Action received for European Patent Application No. 19728844.2, dated Jun. 21, 2022, 8 pages.
Office Action received for Korean Patent Application No. 10-2020-7033785, dated Jan. 10, 2022, 12 pages.
Supplemental Notice of Allowance received for U.S. Appl. No. 16/410,547, dated Apr. 14, 2022, 3 pages.
Supplemental Notice of Allowance received for U.S. Appl. No. 16/410,547, dated Sep. 12, 2022, 3 pages.
Supplemental Notice of Allowance received for U.S. Appl. No. 16/410,547, dated Sep. 22, 2022, 3 pages.
Wang et al., "3D Multi-touch Recognition Based Virtual Interaction", 3rd International Congress on Image and Signal Processing, 2010, pp. 1478-1481.
Notice of Allowance received for U.S. Appl. No. 17/028,298, dated Apr. 27, 2023, 10 pages.
Gil-Castineira et al., "Remote Virtual Peripheral Framework: Enabling Dynamically Composed Devices", IEEE Xplore, 2011, pp. 405-409.
He et al., "Touch-Sensitive Interactive Projection System", IEEE Xplore International Conference on SPAC, Oct. 18-19, 2014, pp. 436-441.
Li et al., "Hand Manipulated Cubic Display for Virtual Environments", IEEE Xplore, Sep. 1, 2011, pp. 322-325.
Seichter et al., "Multitouch Interaction for Tangible User Interfaces", IEEE Xplore, Oct. 1, 2009, pp. 213-214.
Office Action received for European Patent Application No. 19728844.2, dated Jan. 31, 2024, 8 pages.

* cited by examiner

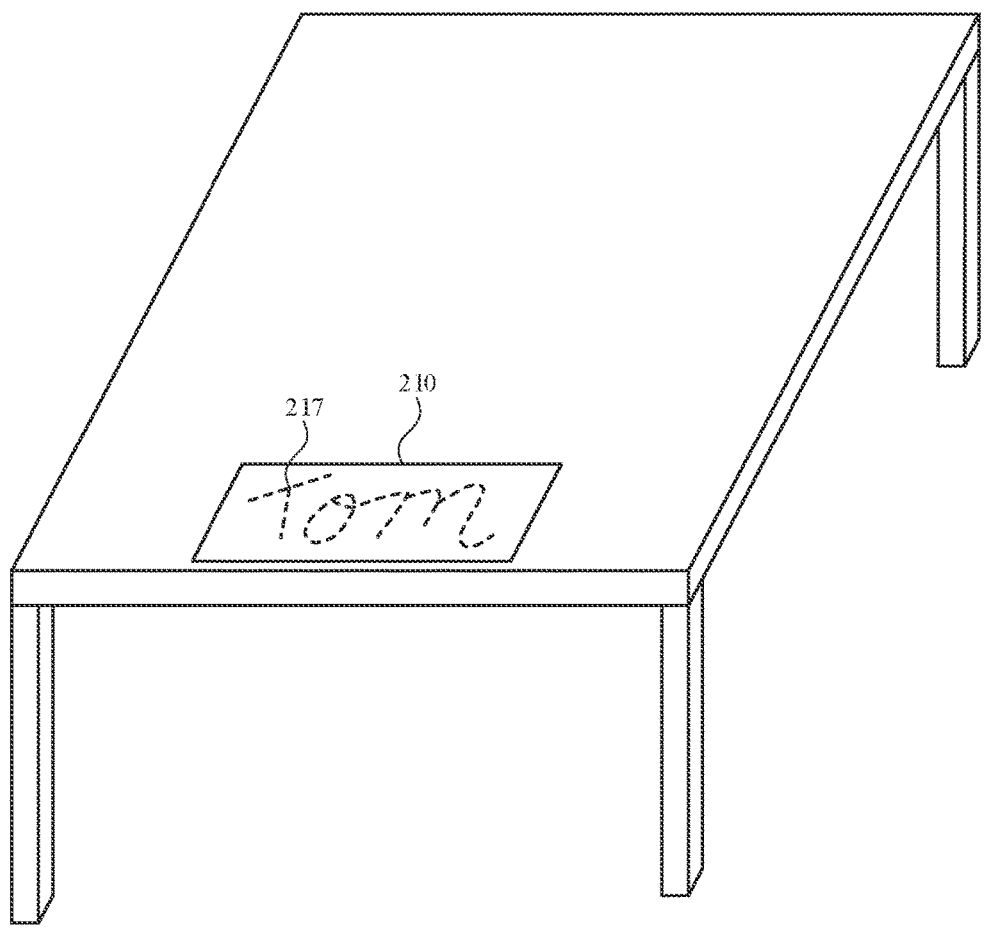
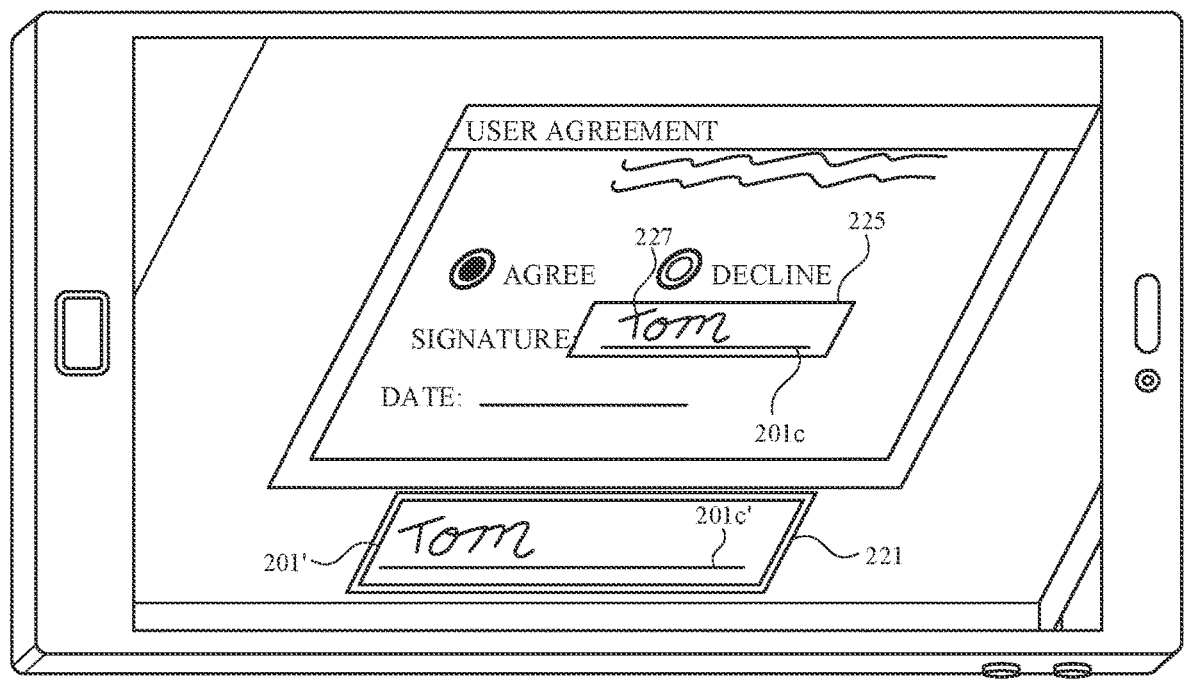
FIG. 2D

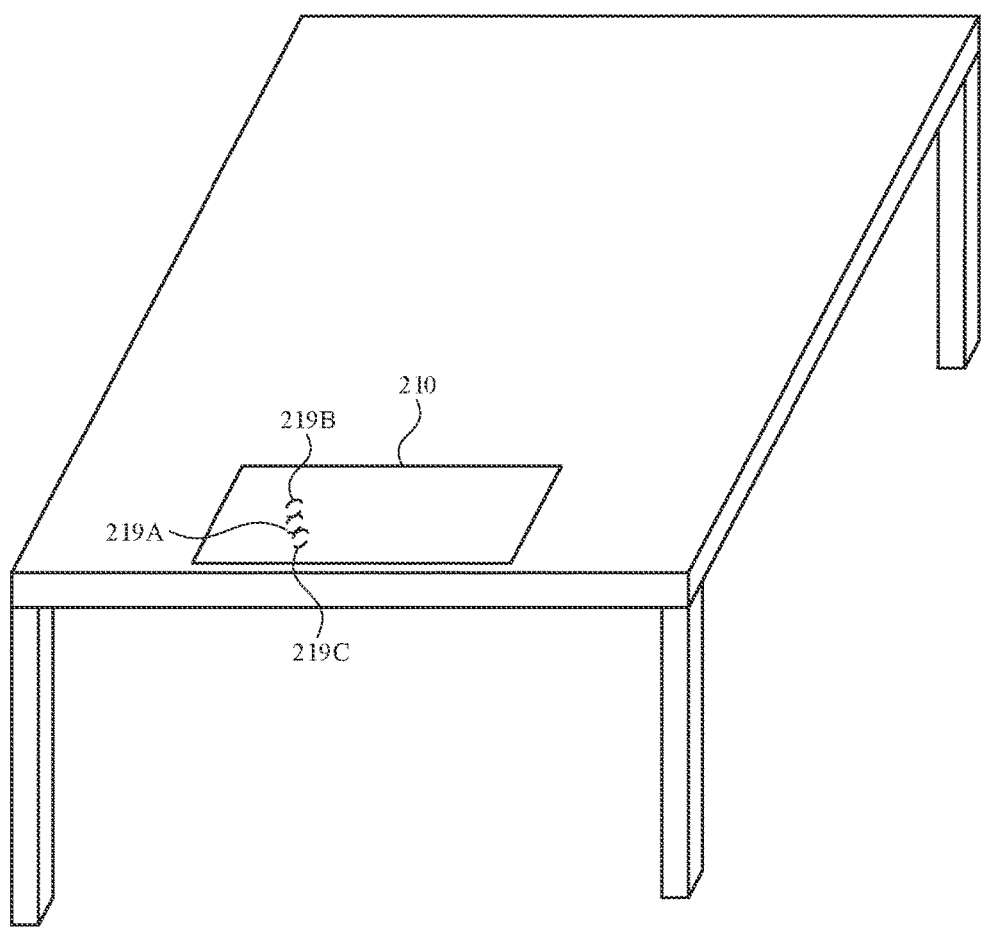
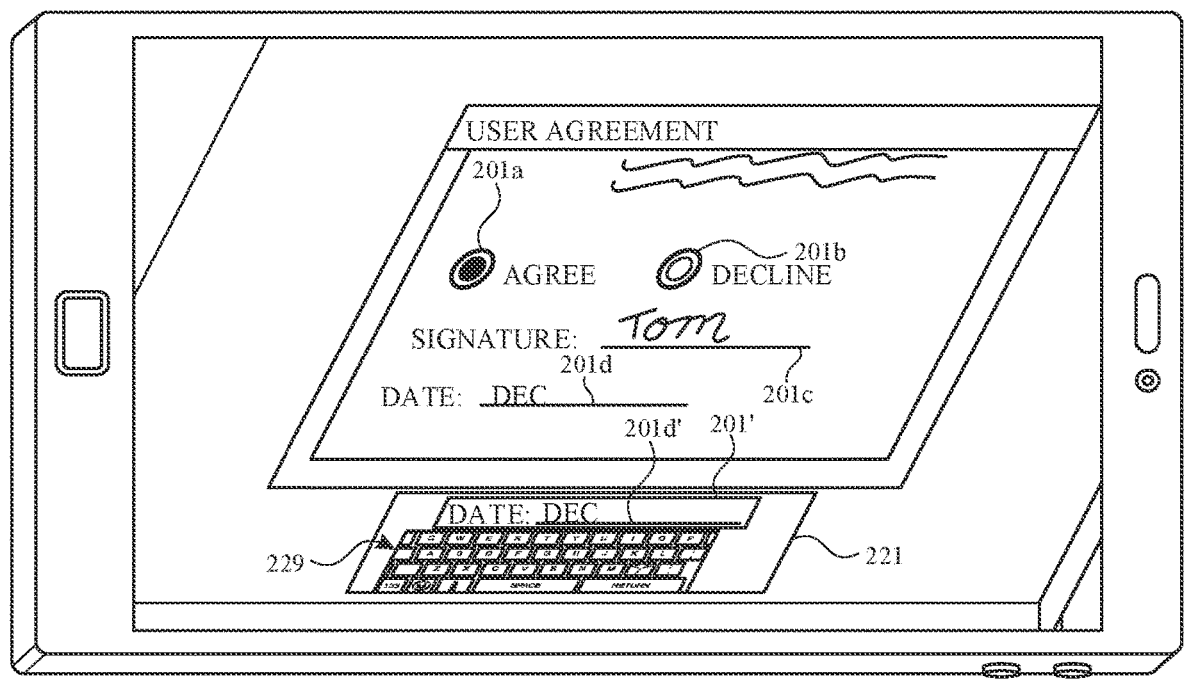
*FIG. 2F*

300 ⇘

304
In response to detecting an input field in a displayed application of a computer-generated reality (CGR) environment, display at least a portion of the displayed application on a representation of a physical input device, the at least a portion of the displayed application including the detected input field.

↓

306
In response to detecting an input received at the physical input device, updating the input field with the input.

↓

308
Display the updated input field.

*FIG. 3*

DISPLAYING PHYSICAL INPUT DEVICES AS VIRTUAL OBJECTS

CROSS REFERENCE TO RELATED APPLICATIONS

This application is a continuation of U.S. patent application Ser. No. 16/410,547, filed May 13, 2019, and entitled "Displaying Physical Input Devices as Augmented-Reality Objects in a Mixed-Reality Environment," which claims the benefit of U.S. Provisional Application No. 62/680,819, filed Jun. 5, 2018, and entitled "Displaying Physical Input Devices as Augmented-Reality Objects in a Mixed-Reality Environment," the content of which are hereby incorporated by reference in their entireties.

TECHNICAL FIELD

The present disclosure relates generally to computer-generated reality (CGR) environments, and more specifically to representations of electronic products in CGR environments.

BACKGROUND

Devices, such as mobile phones, execute computer applications for performing various tasks. Users interact with the computer applications using application user interfaces. Users interact with the application user interfaces using input devices, such as keyboards, to provide input data. For example, users interact with a keyboard to input information into the computer applications using the application user interfaces. For another example, computer applications use the application user interfaces to produce feedback based on received users' input.

SUMMARY

Described herein are techniques for displaying representations of physical input devices and overlaying visual features on the representations of physical input devices in computer-generated reality (CGR) environments. In some embodiments, the techniques include, at an electronic device having a display: in response to detecting an input field in a displayed application of a computer-generated reality (CGR) environment, displaying at least a portion of the displayed application on a representation of a physical input device, the at least the portion of the displayed application including the detected input field; in response to detecting an input received at the physical input device, updating the input field with the input; and displaying the updated input field.

In some embodiments, the input includes a touch input at a location on the physical input device corresponding to a location of the input field displayed on the representation of the physical input device. In some embodiments, the touch input has an intensity component, wherein the intensity exceeds a threshold. In some embodiments, the touch input is a swipe on the physical input device.

In some embodiments, displaying the updated input field comprises displaying the updated input field in the application.

In some embodiments, displaying the updated input field comprises displaying the updated input field in the input field on the physical input device.

In some embodiments, the techniques further comprise, in response to detecting the input received at the physical input device, generating a haptic feedback.

In some embodiments, the techniques further comprise, in response to detecting the input field in the displayed application, displaying, on the representation of the physical input device, virtual keyboard keys.

In some embodiments, the input includes a touch input at a location on the physical input device corresponding to a displayed location of a virtual keyboard key.

In some embodiments, the physical input device is a physical keyboard with physical keyboard keys, the virtual keyboard keys are displayed in accordance with a determination that the detected input field is a text-entry field, and respective displayed keyboard keys have a different value than the physical keyboard keys upon which they are displayed.

In some embodiments, the physical input device is a touch-sensitive surface. In some such embodiments, the touch-sensitive surface does not include a display component.

In some embodiments, the physical input device is external to the electronic device.

In some embodiments, updating the input field with the input comprises receiving input data indicative of the input at the physical input device, and updating the input field in accordance with the received input data.

In some embodiments, displaying the portion of the displayed application on the representation of the physical input device includes displaying, in the CGR environment, the detected input field positioned on the representation of the physical input device.

In some embodiments, the techniques further comprise, in accordance with a determination that the detected input field is a text-entry field, displaying the at least a portion of the displayed application on the representation of the physical input device includes displaying, in the CGR environment, a virtual text box positioned on the representation of the physical input device.

In some embodiments, the techniques further comprise, in accordance with a determination that the detected input field is a digital signature field, displaying the at least a portion of the displayed application on the representation of the physical input device includes displaying, in the CGR environment, a virtual digital signature box positioned on the representation of the physical input device.

In some embodiments, the techniques further comprise, in accordance with a determination that the detected input field includes one or more radio buttons, displaying the at least a portion of the displayed application on the representation of the physical input device includes displaying, in the CGR environment, one or more virtual radio buttons positioned on the representation of the physical input device.

In some embodiments, a device for displaying representations of physical input devices and overlaying visual features on the representations of physical input devices in a CGR environment includes one or more processors and memory storing one or more programs configured to be executed by the one or more processors. The one or more programs include instructions for: in response to detecting an input field in a displayed application of a CGR environment, displaying at least a portion of the displayed application on a representation of a physical input device, the at least a portion of the displayed application including the detected input field; in response to detecting an input received at the physical input device, updating the input field with the input; and displaying the updated input field.

In some embodiments, a non-transitory (or, optionally, transitory) computer-readable storage medium storing one or more programs configured to be executed by one or more processors displays representations of physical input devices and overlaying visual features on the representations of physical input devices in a CGR environment. The one or more programs include instructions for: at an electronic device having a display, in response to detecting an input field in a displayed application of a CGR environment, displaying at least a portion of the displayed application on a representation of a physical input device, the at least a portion of the displayed application including the detected input field; in response to detecting an input received at the physical input device, updating the input field with the input; and displaying the updated input field.

BRIEF DESCRIPTION OF THE DRAWINGS

In the following description, reference is made to the accompanying drawings which form a part thereof, and which illustrate several embodiments. It is understood that other embodiments may be utilized and structural and operational changes may be made without departing from the scope of the present disclosure. The use of the same reference symbols in different drawings indicates similar or identical items.

FIGS. 2A-2F illustrate a device displaying representations of physical input devices and overlaying visual features on the representations of the physical input devices in a CGR environment.

FIG. 3 depicts an exemplary technique for displaying representations of physical input devices and overlaying visual features on the representations of the physical input devices in a CGR environment.

DETAILED DESCRIPTION

Figure 1A:
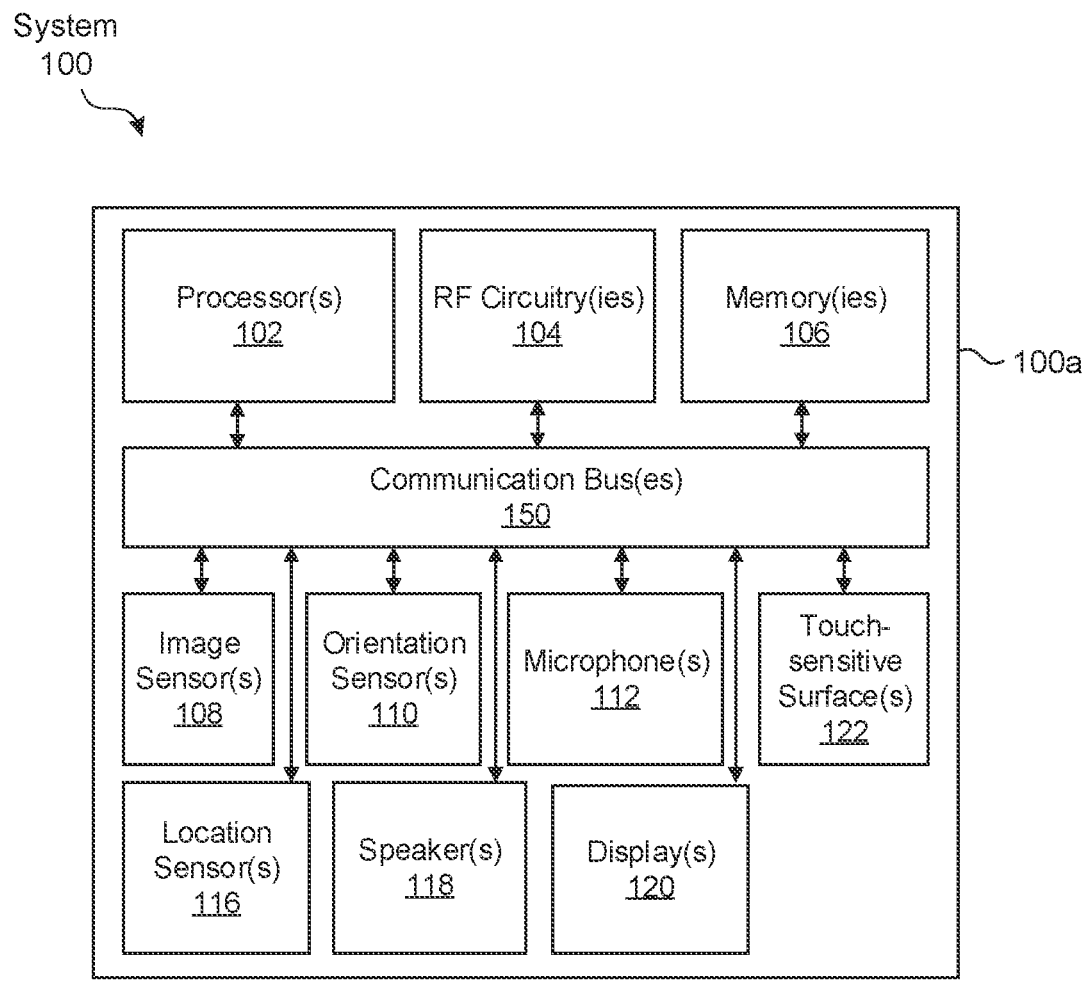
FIGS. 1A-1B depict an exemplary system for use in various computer-generated reality technologies.

Various embodiments of electronic systems and techniques for using such systems in relation to various computer-generated reality technologies are described. In particular, the present disclosure provides techniques for displaying representations of physical input devices and overlaying visual features on the representations of physical input devices in a CGR environment. The techniques include displaying a virtual application in a CGR environment and, in response to detecting an input field in the displayed virtual application, projecting at least a portion of the displayed application onto a representation of a physical input device. The at least a portion of the displayed application includes the detected input field. In response to detecting an input received at the physical input device, the input field is updated with the input, and the updated input field is displayed.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
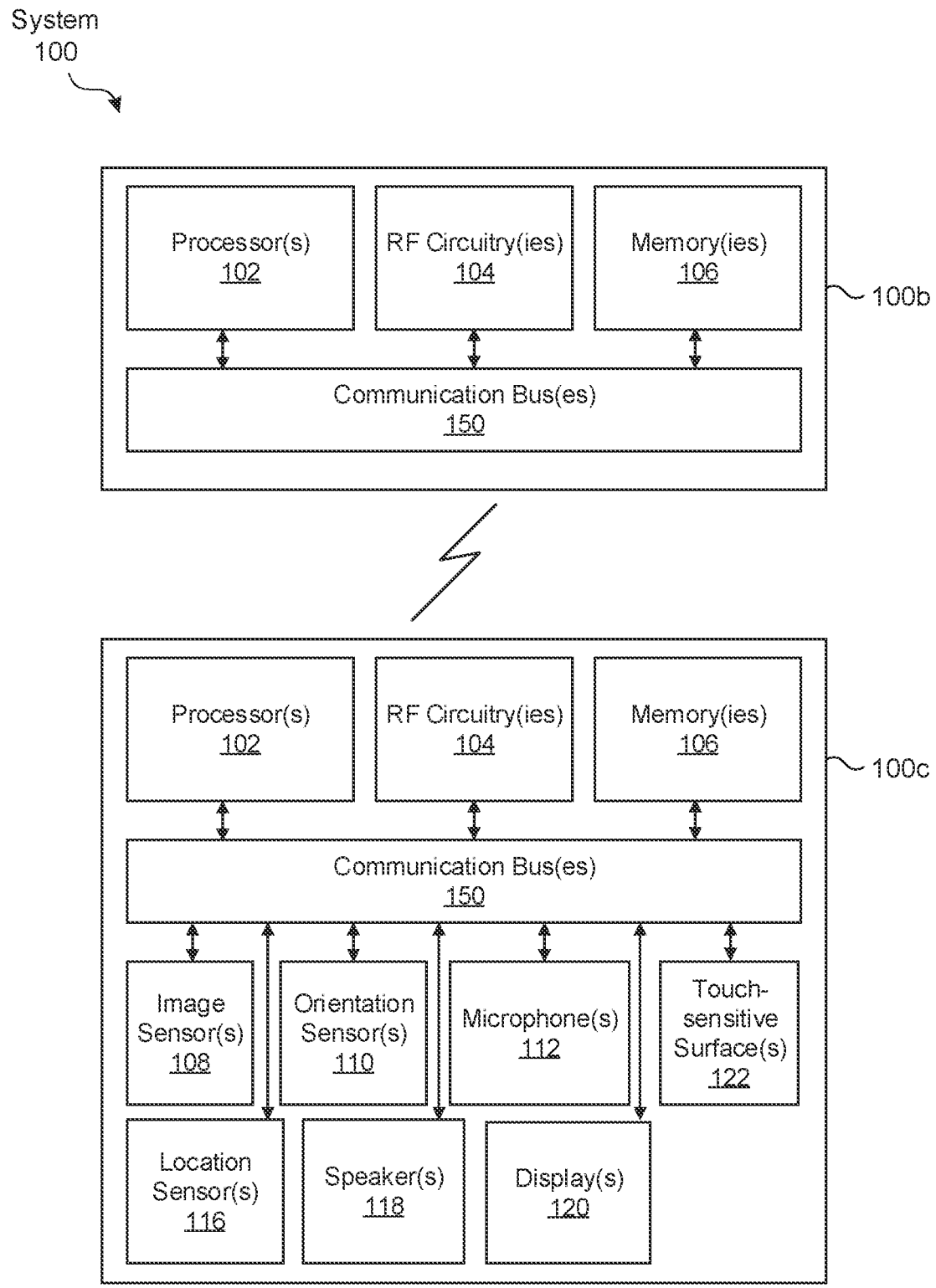

FIG. 1A and FIG. 1B depict an exemplary system 100 for use in various computer-generated reality technologies.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a phone or tablet, where the phone or tablet is in communication with the base station device. In some embodiments, device 100a is implemented in a base station device or a phone or tablet. In some embodiments, the phone or tablet can instead be a head-mounted display (IMD) device designed to be worn by the user.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a phone or tablet) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some embodiments, system 100 is a mobile device, such as a phone or tablet. In some embodiments, system 100 is a head-mounted display (IMD) device.

System 100 includes processor(s) 102 and memory(ies) 106. Processor(s) 102 includes one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some embodiments, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some embodiments, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display. In some embodiments, display(s) 120 include a transparent additive display with, or without, a blocking layer.

In some embodiments, system 100 includes touch-sensitive surface(s) 122 for receiving user inputs, such as tap inputs and swipe inputs. In some embodiments, display(s) 120 and touch-sensitive surface(s) 122 form touch-sensitive display(s).

System 100 includes image sensor(s) 108. Image sensors(s) 108 optionally include one or more visible light image sensors, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some embodiments, system 100 uses CCD sensors, event cameras, and depth sensors in combination to detect the physical environment around system 100. In some embodiments, image sensor(s) 108 include a first image sensor and a second image sensor. The first image sensor and the second image sensor are optionally configured to capture images of physical objects in the real environment from two distinct perspectives. In some embodiments, system 100 uses image sensor(s) 108 to receive user inputs, such as hand gestures. In some embodiments, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some embodiments, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Device 100*a* is configured to support a variety of applications, such as one or more of the following: a drawing application, a presentation application, a word processing application, a website creation application, a disk authoring application, a spreadsheet application, a gaming application, a telephone application, a video conferencing application, an email application, an instant messaging application, a workout support application, a photo management application, a digital camera application, a digital video camera application, a web browsing application, a digital music player application, a digital video player application, and/or navigation applications. It should be appreciated that device 100*a* is capable of supporting applications other than the examples listed here. It should also be appreciated that applications may appear as virtual objects in a CGR environment.

In some embodiments, device 100*a* facilitates a user's interaction with the applications or other virtual objects by detecting (e.g., using image sensor(s) 108), in the real environment, gestures or other input from a user. For example, using image sensor(s) 108, device 100*a* may detect a position, or series of movements, of a user's hand and/or fingers in the real environment. Device 100*a* then interprets these detected positions and/or movements as input for interfacing with a virtual object such as an application (e.g., a virtual application) displayed in the CGR environment. In this way, device 100*a* allows a user to interact with the displayed virtual application, and/or other virtual objects in the CGR environment, by performing gestures or motions in the real environment.

In some embodiments, representations of one or more physical objects in the real world are displayed on display 120 of device 100*a* in the CGR environment so that a user can see the physical object(s) in the CGR environment and, therefore, interact with the physical object(s) in the real world. Input data received at device 100*a* as a result of user interaction with the physical object(s) in the real world is used by device 100*a* to enable the user to interface with the applications and/or other virtual objects in the CGR environment. In some embodiments, this input data is generated by device 100*a* when it detects (e.g., using image sensor(s) 108), in the real environment, gestures (e.g., a position, or series of movements, of a user's hand and/or fingers in the real environment) with respect to the one or more physical objects. For example, finger gestures detected by device 100*a* (e.g., using image sensor(s) 108) at location(s) corresponding to one or more keys of a physical keyboard are interpreted as user inputs corresponding to respective key(s) of the physical keyboard. More specifically, detecting (e.g., using image sensor(s) 108) activation of a particular key of the physical keyboard results in device 100*a* generating an input string comprising that particular key for entry into an input field. In some embodiments, such as that discussed immediately below, the physical keyboard detects the user input at the physical keyboard by identifying the key activated by the user, and the physical keyboard communicates the activated key to device 100a (e.g., using communication bus(es) 150) for entry, by device 100a, into an input field. In such embodiments, the input data is generated by the physical device in the real world, and is communicated (e.g., using communication bus(es) 150) to device 100a. Device 100a receives the input data and, as mentioned above, processes the input data to enable the user to interface with the application(s) and/or other virtual objects in the CGR environment.

In some embodiments, device 100a facilitates a user's interaction with the applications or other virtual objects in the CGR environment by receiving input from physical objects, where the input has been detected by the physical object (e.g., a physical keyboard or a physical trackpad). In some embodiments, device 100a receives input from the physical object(s) without also detecting gestures. For example, a physical device such as a keyboard or trackpad transmits (e.g., using communication bus(es) 150) user input to device 100a. In some embodiments, device 100a receives input from the physical object(s) and supplements the received input with data obtained by detecting (e.g., using image sensor(s) 108) gestures from the user as discussed above. Representations of such physical objects are, optionally, displayed in the CGR environment.

In some embodiments, device 100a augments representations of physical objects by displaying one or more virtual objects positioned on or around (e.g., near or adjacent) the representation of the physical object. For example, as discussed below with respect to FIGS. 2A-2F, device 100a displays a portion of a virtual application onto a representation of a physical trackpad. As another example, as discussed below with respect to FIGS. 4A-4B, device 100a displays (overlays) a virtual set of input controls onto a representation of a physical keyboard. In some embodiments, virtual objects are displayed overlaying the representation of a physical object (e.g., displayed as being positioned on top of the representation of the physical object). In some embodiments, the overlaid virtual object or, optionally, a portion thereof, is opaque such that the representation of the physical object is obscured by the overlaid virtual object (or portion of the overlaid virtual object). In some embodiments, the overlaid virtual object or, optionally, a portion thereof, is semi-opaque such that the representation of the physical object is partially obscured by the overlaid virtual object (or portion of the overlaid virtual object). In such embodiments, portions of the representation of the physical object are visible (e.g., discernable) through the virtual object displayed overlaying the representation of the physical object. FIGS. 2A-2F and 4A-4B illustrate device 100a displaying, on display 120, representations of physical input devices and overlaying visual features on the representations of physical input devices in a CGR environment. In other words, device 100a displays, in the CGR environment, a representation of the physical input device having one or more virtual features associated with the representation of the physical input device. In FIGS. 2A-2F and 4A-4B, device 100a is shown as a phone or tablet device having a single display component (display 120). It should be understood, however, that device 100a can be any device configured to display a CGR environment, such as an HMD device, or a device having a transparent display where physical objects are directly viewable through the display, and where virtual objects are displayed or otherwise viewable on the transparent display.

Each physical input device shown in FIGS. 2A-2F and 4A-4B is a physical object in the real environment external to device 100a. The physical input device is displayed in the CGR environment as a combination of a virtual object and a representation of the physical object (or, alternatively, the physical object is viewable directly through the display, such as through a transparent display). For example, in some embodiments, device 100a augments a representation of a physical input device such that one or more virtual (e.g., computer-generated) attributes or features are displayed on display 120 as a component of the CGR environment and associated with the representation of the physical input device. In some examples, device 100a generates an image of a portion of a virtual application and displays the image at a position on display 120 that corresponds to a displayed location of a representation of a physical trackpad in the CGR environment. In some examples, device 100a generates an image of various keyboard keys associated with a user input function and displays the image at a position on display 120 that corresponds to a displayed location of respective keys of a representation of a physical keyboard in the CGR environment. Alternatively, the display is transparent, and the keyboard keys are displayed at a position on the display that corresponds to a location at which the physical keyboard is visible through the transparent display.

In some embodiments, device 100a generates and displays a virtual application on display 120. The virtual application is a computer-generated user interface (UI) displayed by device 100a on display 120 as a component of the CGR environment. Device 100a generates the virtual application with various attributes such as, for example, the visual appearance of the application, the displayed orientation of the application, operation of the application, components of the application, and functionality of the various components of the application. In some embodiments, device 100a detects various components of the application and performs operations based on the detected components of the application. For example, device 100a identifies a physical input device in the real environment and, in response to detecting an input field of the displayed application, device 100a augments a representation of the physical input device in the CGR environment so that device 100a can receive an input (e.g., user input) provided using the physical input device in the real environment (in accordance with its augmented functionality), and can update the input field of the virtual application, as discussed in greater detail below.

In some embodiments, the displayed orientation of the application includes an orientation (e.g., angle or position) of the application as displayed in the CGR environment relative to an actual location of a user, or an anticipated or expected location of the user (e.g., based on the location of device 100a). For example, the virtual application is oriented such that it faces the user so the user can easily view the application. More specifically, the user is presumed, in some embodiments, to be co-located with device 100a (e.g., because the user is wearing device 100a), therefore, the application is oriented such that it faces device 100a. In some embodiments, the location of the user (actual, anticipated, expected, or otherwise) is approximated based on one or more factors, such as the location or position of device 100a and/or the location or position of one or more physical objects comprising the CGR environment. For example, in some embodiments, an expected location of the user is determined to be near a representation of a physical keyboard or physical trackpad positioned upon which the application is projected.

Figure 2A:
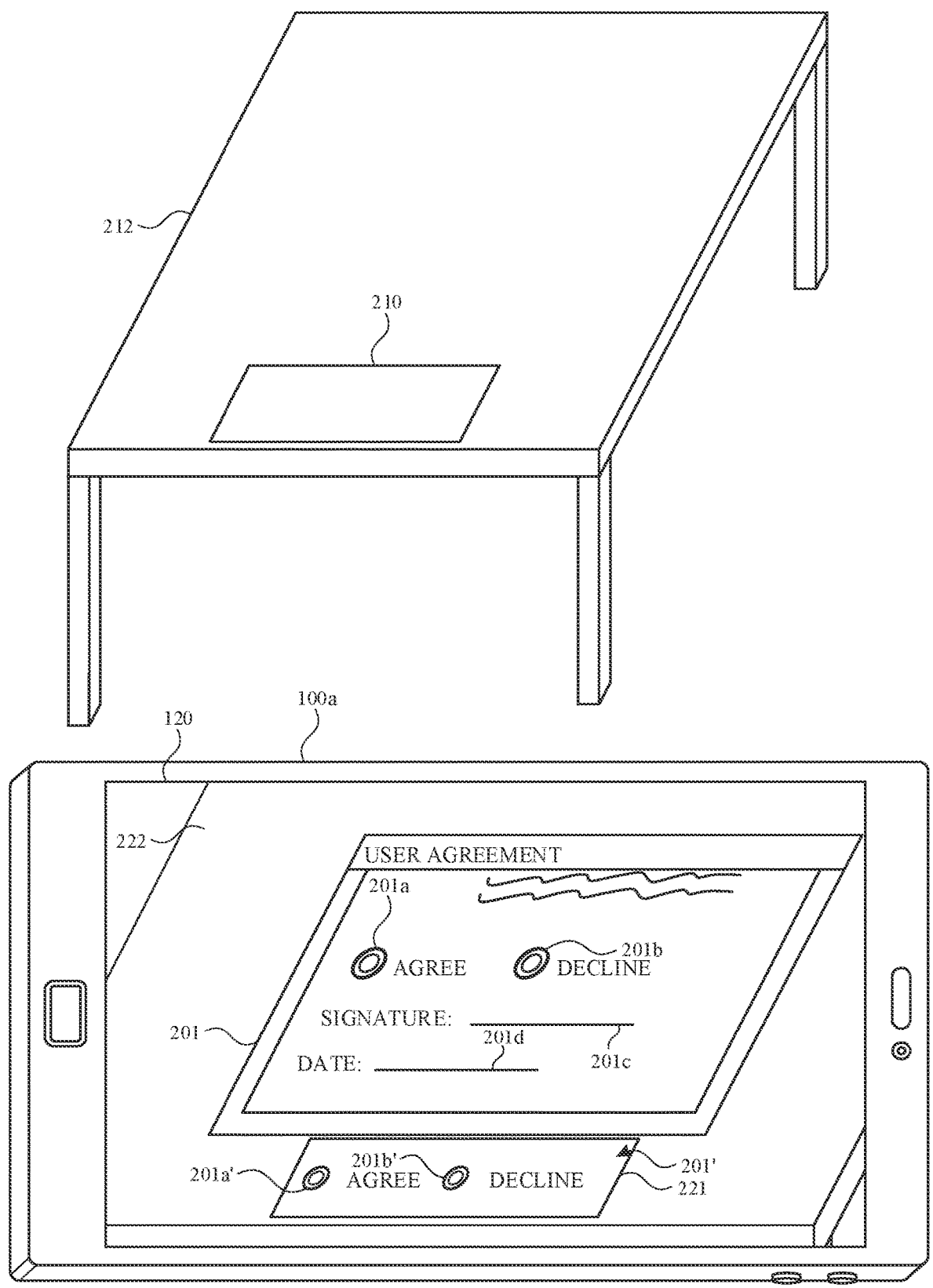

Referring now to FIGS. 2A-2F, device 100a detects (e.g., using image sensor(s) 108) physical input device 210 (e.g., a trackpad) positioned on physical tabletop surface 212 and displays, on display 120, representation 221 of the physical input device positioned on representation 222 of the physical tabletop surface. Alternatively, the embodiments discussed with respect to FIGS. 2A-2F can include a device having a transparent display, and virtual objects are displayed on the transparent display, while physical objects are viewable through the transparent display. Representation 221 of the physical input device has a same position with respect to representation 222 of the physical tabletop surface as the position of physical input device 210 with respect to physical tabletop surface 212. Device 100a also displays virtual application 201. Virtual application 201 includes input fields 201a-201d. In response to detecting one or more of input fields 201a-201d, device 100a displays (e.g., projects) a portion 201' of virtual application 201 onto representation 221 of the physical input device, the portion 201' including detected input fields 201a-201d. For example, as illustrated in FIG. 2A, portion 201' of the virtual application that is projected onto representation 221 of the physical input device includes projections 201a' and 201b' of detected input fields 201a and 201b. Device 100a then receives (e.g., using communication bus(es) 150) an input (e.g., user input) from physical input device 210 (e.g., input detected by physical input device 210 detecting user interaction with physical input device 210) and updates input fields 201a-201d/201a'-201d'.

In some embodiments, the physical input devices (e.g., trackpad 210, keyboard 410) are external to device 100a (e.g., separate from device 100a) and, in the real environment, do not comprise a display component such as, for example, a touchscreen display. As such, device 100a is configured to transform the physical input device, in the CGR environment, into a representation of the physical input device, but with added display capabilities that are lacking from the physical input device in the real environment. Device 100a can also augment functionality of the representation of the physical input device in the CGR environment by associating virtual features (e.g., input functions) with the representation of the physical input device. For example, a trackpad (e.g., trackpad 210) having a touch-sensitive surface and no display capability in the real environment, is augmented by device 100a in the CGR environment to incorporate a display of at least a portion (e.g., 201') of a computer application (e.g., application 201) positioned on a representation of the trackpad such that touch inputs on the physical trackpad in the real environment are associated with the content displayed on the representation of the trackpad in the CGR environment. In this way, device 100a enhances operation of system 100 by customizing the functionality (e.g., by customizing the appearance of the application displayed on the representation of the physical input device) of the physical input device (e.g., trackpad) in the CGR environment. For example, device 100a enhances system 100 through generating and displaying virtual features and associating those virtual features with the physical input devices in a manner that is customized to the specific application displayed in the CGR environment. By augmenting the representation of the physical input device to customize its functionality in the CGR environment, device 100a presents users with customized control options for interfacing with the computer application (e.g., 201) without cluttering the CGR environment with additional displayed control options (e.g., menu options, etc.). This enhances operability of device 100a and makes the user-device interface more efficient (e.g., by helping the user to provide proper inputs and reducing user mistakes when operating/interfacing with the augmented physical input device) which, additionally, reduces power usage and improves battery life of device 100a by enabling the user to use device 100a more quickly and efficiently.

Referring to FIG. 2A, device 100a detects (e.g., using image sensor(s) 108), physical trackpad 210 positioned on physical tabletop surface 212 in the real environment. Trackpad 210 is a physical input device in the real environment that has touch-sensing capabilities (e.g., provided by a touch-sensitive surface), but lacks a display component and any display capabilities. Device 100a displays, in the CGR environment shown on display 120, representation 222 of tabletop surface 212, representation 221 of trackpad 210 positioned on representation 222 of the tabletop surface, and virtual application 201 projected onto representation 222 of the tabletop surface. In some embodiments, such as that shown in FIGS. 2A-2F, device 100a overlays virtual application 201 onto a representation of a physical surface, such as a wall or the tabletop surface, in the CGR environment. In some embodiments, device 100a overlays virtual application 201 onto a virtual surface so that virtual application 201 appears to be floating in the CGR environment. Virtual application 201 includes a form for executing a user agreement, which may be modified using, for example, a word processing application, a Portable Document Format (PDF) application, or a web browsing application. Virtual application 201 includes input field 201a, which is a radio button for selecting (e.g., based on user input) an "Agree" option, input field 201b, which is a radio button for selecting (e.g., based on user input) a "Decline" option, input field 201c, which is a digital signature field for receiving a signature for the user agreement form, and input field 201d, which is a text-entry field for receiving a date.

Device 100a detects input fields 201a-201d in displayed virtual application 201, and displays (e.g., concurrently), on representation 221 of the trackpad in the CGR environment, portion 201' of the virtual application including one or more of detected input fields 201a-201d. For example, as shown in FIG. 2A, in response to detecting input fields 201a and 201b, device 100a displays, on representation 221 of the trackpad in the CGR environment, portion 201' that includes projection 201a' of input field 201a and projection 201b' of input filed 201b, along with the "Agree" and "Decline" text corresponding to respective input fields 201a and 201b.

Figure 2B:
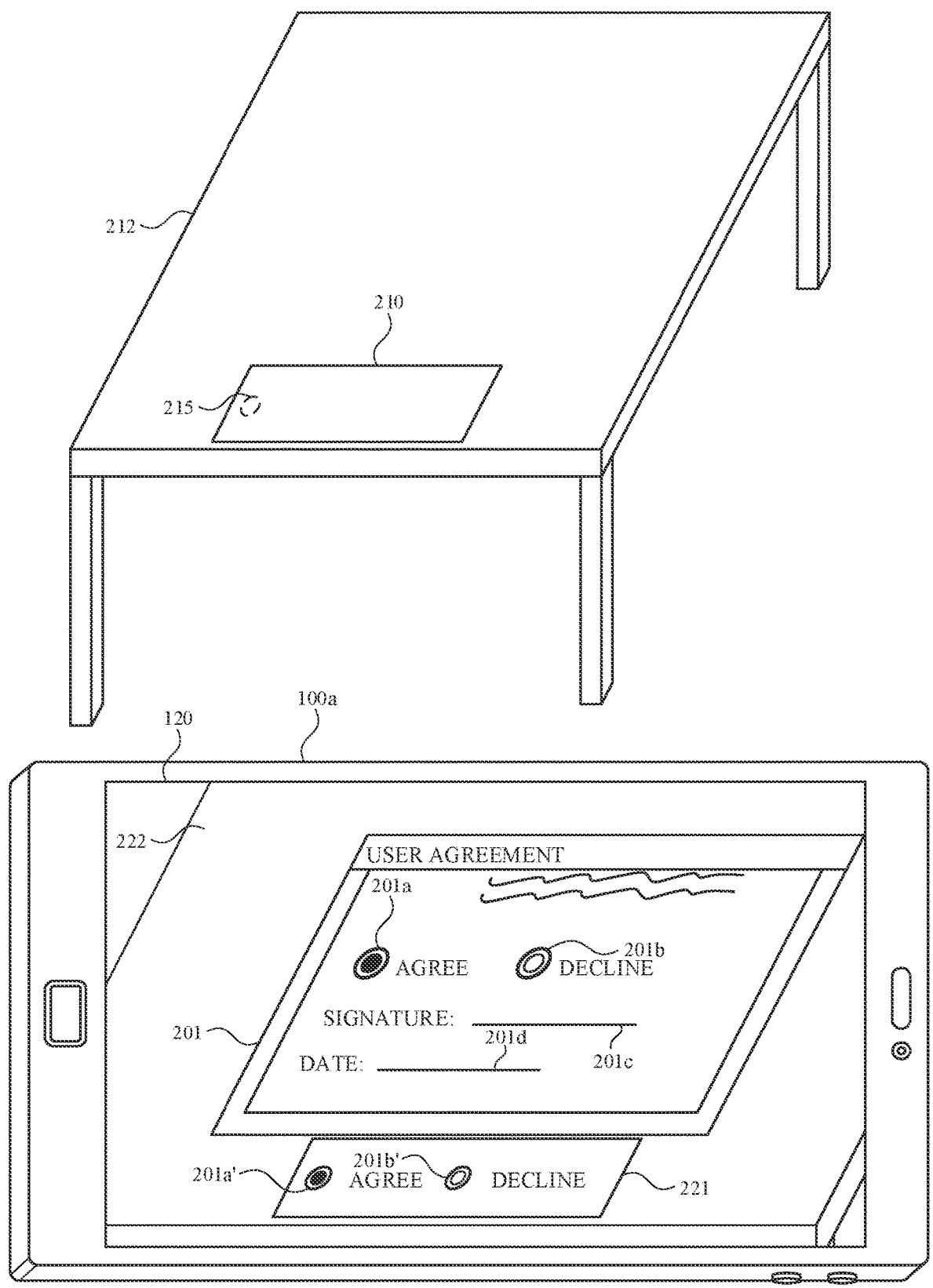

Referring now to FIG. 2B, device 100a receives an input (e.g., a user input) corresponding to selection/activation of "Agree" radio button 201a. Specifically, physical trackpad 210 receives input 215 (e.g., user input represented by a dashed circle) at a location on physical trackpad 210 that corresponds to a displayed location of projection 201a' of input field 201a on representation 221 of the trackpad in the CGR environment. Input 215 can be a touch input such as, for example, a touch-and-lift gesture, a touch-and-hold gesture, a touch-and-slide (e.g., swipe) gesture, or a touch input having an intensity component, wherein the intensity exceeds a threshold (e.g., a touch input on trackpad 210 having an intensity (force or pressure), wherein the intensity of the contact has a range of values that are determined or measured using one or more force or pressure sensors underneath or adjacent to the touch-sensitive surface of the trackpad). In some embodiments, an input (e.g., a user input) includes one or more of these touch inputs.

Because device 100a displays portion 201' of the virtual application on representation 221 of the trackpad in the CGR environment, and because the location and position of representation 221 of the trackpad in the CGR environment corresponds to the actual location of physical trackpad 210 in the real environment, the user is able to accurately determine (and, in fact, view in the CGR environment) the locations of projections 201a' and 201b' of the input fields with respect to trackpad 210 in the real environment. Device 100a receives (e.g., using communication bus(es) 150) the touch input from physical trackpad 210, and associates the location of touch input 215 on trackpad 210 with the location of the virtual content (e.g., portion 201' of the virtual application) displayed on representation 221 of the trackpad in the CGR environment to determine that touch input 215, in the real environment, corresponds to the location of projection 201a' of the radio button input field associated with the "Agree" option in the CGR environment. In some embodiments, device 100a provides a feedback in response to detecting an input (e.g., user input) (e.g., touch input 215). For example, device 100a generates audio (e.g., a "click" sound) to indicate a selection performed by the input. Optionally, device 100a provides a haptic feedback by communicating (e.g., using communication bus(es) 150) a command to generate a vibration (e.g., indicative of a mouse click) at trackpad 210. In some examples, device 100a displays a visual feedback in the CGR environment in response to (and to indicate) receipt of the input (e.g., user input).

In response to determining that touch input 215 corresponds to projection 201a' of the radio button input field associated with the "Agree" option, device 100a interprets touch input 215 as a selection of input field 201a, and updates input field 201a accordingly. For example, as shown in FIG. 2B, device 100a darkens input field 201a displayed on virtual application 201 to illustrate a selection of input field 201a. In some embodiments, device 100a also darkens projection 201a' of the "Agree" radio button on displayed portion 201' of the virtual application. Because touch input 215 was not interpreted as a selection of input field 201b, device 100a does not darken projection 201b' or input field 201b.

Figure 2C:
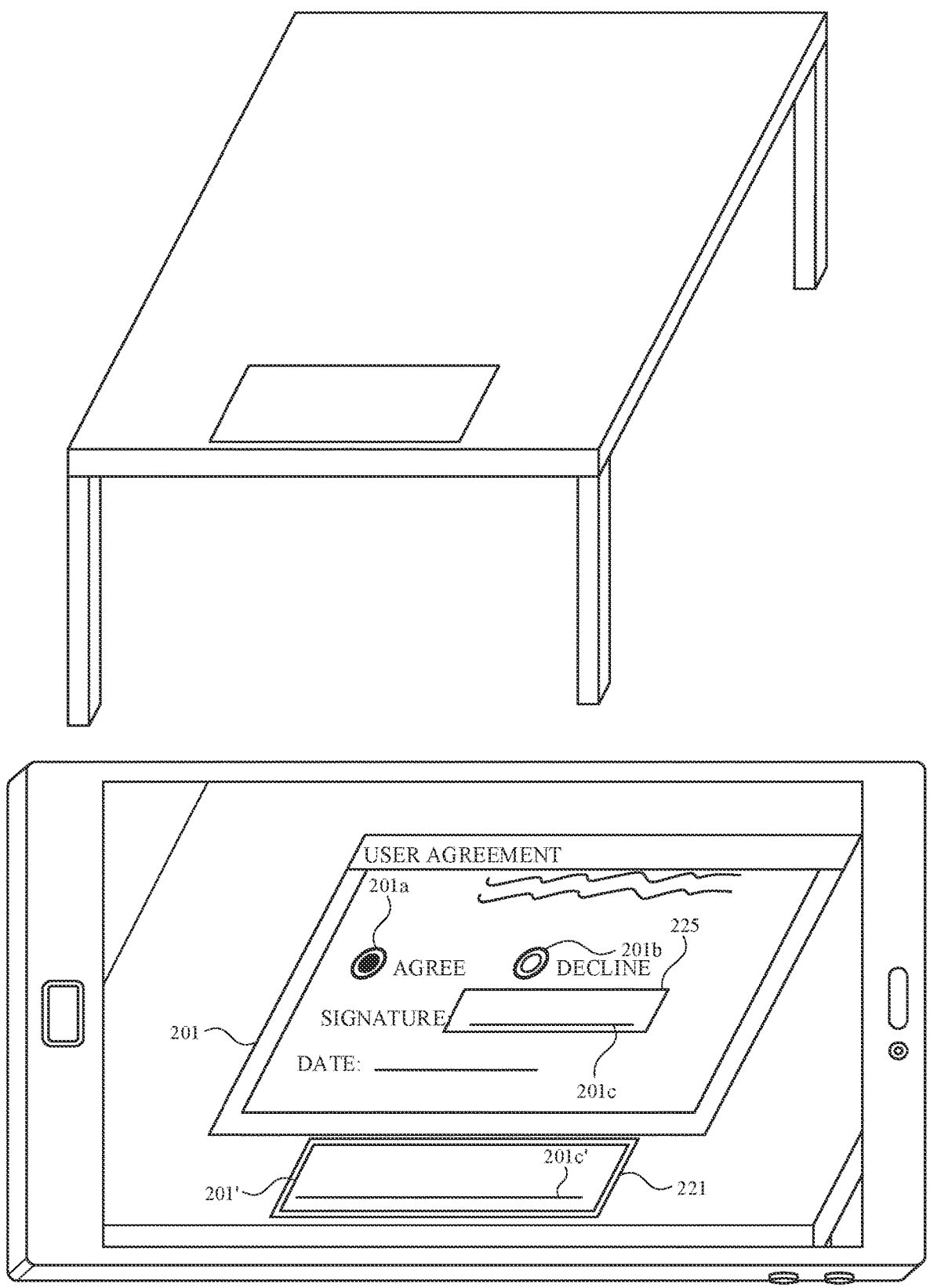

As illustrated in FIGS. 2C and 2D, device 100a detects input field 201c and displays, on representation 221 of the trackpad in the CGR environment, portion 201' virtual application 201 that includes projection 201c' of input field 201c, which is a digital signature field for signing the user agreement form. Device 100a displays darkened radio button input field 201a and unmodified radio button input field 201b on virtual application 201. In some embodiments, such as that shown in FIGS. 2C and 2D, device 100a displays indicator 225 on virtual application 201 that represents the boundary of portion 201' that is displayed on representation 221 of the trackpad. Indicator 225 highlights, to the user, the input field detected by device 100a and provides a visual representation of the portion of the virtual application that is displayed on representation 221 of the physical input device (e.g., trackpad).

As shown in FIG. 2D, device 100a receives an input (e.g., user input) for signing the digital signature field. Physical trackpad 210 receives touch input 217 (represented by dashed lines) at a location on physical trackpad 210 that corresponds to a displayed location of projection 201c' of input field 201c on representation 221 of the trackpad in the CGR environment. Optionally, touch input 217 is a touch input such as, for example, a touch-and-lift gesture, a touch-and-hold gesture, a touch-and-slide (e.g., swipe) gesture, or a touch input having an intensity component, wherein the intensity exceeds a threshold (e.g., a touch input on trackpad 210 having an intensity (force or pressure), wherein the intensity of the contact has a range of values that are determined or measured using one or more force or pressure sensors underneath or adjacent to the touch-sensitive surface of the trackpad).

Because device 100a displays portion 201' of the virtual application on representation 221 of the trackpad in the CGR environment, and because the location and position of representation 221 of the trackpad in the CGR environment corresponds to the actual location of physical trackpad 210 in the real environment, the user is able to accurately determine (and, in fact, view in the CGR environment) the location of projection 201c' of the input field with respect to trackpad 210 in the real environment. This allows the user to accurately trace their finger along the touch-sensitive surface of physical trackpad 210 to enter a digital signature in the CGR environment. Device 100a receives (e.g., using communication bus(es) 150) the touch input from physical trackpad 210, and associates the movement of touch input 217 on trackpad 210 with the location of the virtual content (e.g., portion 201') displayed on representation 221 of the trackpad in the CGR environment to determine that touch input 217, in the real environment, corresponds to a signature on projection 201c' of the digital signature input field in the CGR environment. In some embodiments, device 100a provides a feedback in response to detecting touch input 217.

In response to receiving touch input 217, device 100a interprets the touch input as a digital signature and updates input field 201c accordingly. For example, as shown in FIG. 2D, device 100a displays digital signature 227 on digital signature input field 201c in virtual application 201. In some embodiments, device 100a also displays (e.g., concurrently) digital signature 227 on projection 201c' of the digital signature input field displayed on portion 201' of the virtual application. In some embodiments, device 100a updates input field 201c concurrently with detecting touch input 217. In some embodiments, device 100a updates the input field 201c after touch input 217 is complete (e.g., lift-off of the input is detected).

Figure 2E:
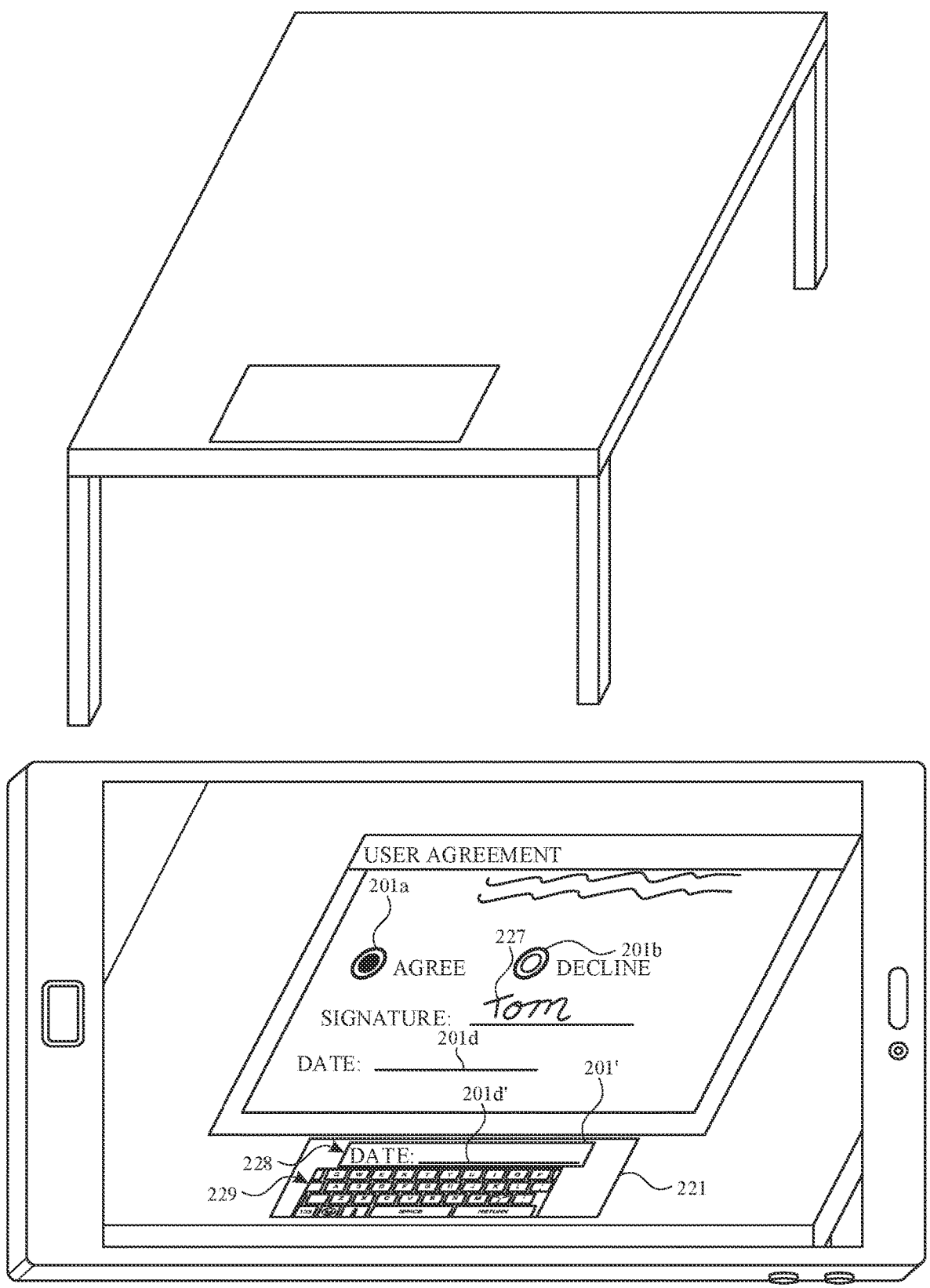

As illustrated in FIGS. 2E and 2F, device 100a detects input field 201d and displays, on representation 221 of the trackpad in the CGR environment, portion 201' of virtual application 201 that includes "Date:" text 228 of input field 201d, and projection 201d' of input field 201d, which is a text-entry field for receiving a date input. Device 100a determines input field 201d is a text-entry field, and in response, displays, on representation 221 of the trackpad in the CGR environment, virtual keyboard 229. In some embodiments, such as that shown in FIGS. 2E and 2F, device 100a displays virtual keyboard 229 in addition to portion 201' of the virtual application and the included projection 201d' of the input field (and text 228). In other embodiments, device 100a displays virtual keyboard 229 in lieu of projection 201d' of the input field (and text 228), or in lieu of portion 201' of the virtual application. As shown in FIG. 2E, device 100a also displays darkened radio button input field 201a, unmodified radio button input field 201b, and signed digital signature input field 201c on virtual application 201.

As shown in FIG. 2F, device 100a receives an input (e.g., user input) for entering the text of the text-entry input field. Physical trackpad 210 receives touch inputs 219A, 219B, and 219C (represented by dashed circles) at locations on physical trackpad 210 that correspond to respective displayed locations of keys on virtual keyboard 229 displayed on representation 221 of the trackpad in the CGR environment. Each of respective user inputs 219A-219C are optionally a touch input such as, for example, a touch-and-lift gesture, a touch-and-hold gesture, a touch-and-slide (e.g., swipe) gesture, or a touch input having an intensity component, wherein the intensity exceeds a threshold (e.g., a touch input on trackpad 210 having an intensity (force or pressure), wherein the intensity of the contact has a range of values that are determined or measured using one or more force or pressure sensors underneath or adjacent to the touch-sensitive surface of the trackpad).

Because device 100a displays virtual keyboard 229 on representation 221 of the trackpad in the CGR environment, and because the location and position of representation 221 of the trackpad in the CGR environment corresponds to the actual location of physical trackpad 210 in the real environment, the user is able to accurately determine (and, in fact, view in the CGR environment) the locations of the keys of virtual keyboard 229 with respect to trackpad 210 in the real environment. Device 100a receives (e.g., using communication bus(es) 150) the touch input from physical trackpad 210, and associates the locations of each of respective touch inputs 219A-219C on trackpad 210 with the locations of the keys of virtual keyboard 229 displayed on representation 221 of the trackpad in the CGR environment. In this way, device 100a determines that touch inputs 219A-219C, in the real environment, correspond to the locations of the "D," "E," and "C" keys, respectively, in the CGR environment. In some embodiments, device 100a provides a feedback in response to detecting a user input (e.g., touch inputs 219). For example, device 100a generates audio (e.g., a "click" sound) to indicate a selection of a virtual keyboard key. Device 100a optionally provides a haptic feedback by communicating (e.g., using communication bus(es) 150) a command to generate a vibration (e.g., indicative of a key press) at trackpad 210. In some examples, device 100a displays a visual feedback in the CGR environment to indicate receipt of the input (e.g., user input).

In response to determining that touch input 219A corresponds to the location of the "D" key on virtual keyboard 229, device 100a interprets touch input 219A as a selection of the "D" key on virtual keyboard 229, and updates input field 201d accordingly. For example, as shown in FIG. 2F, device 100a displays a "D" character in text-entry input field 201d displayed on virtual application 201. In response to determining that touch inputs 219B and 219C correspond to the locations of the "E" and "C" keys, respectively, on virtual keyboard 229, device 100a interprets touch inputs 219B and 219C as selections of the respective "E" and "C" keys on virtual keyboard 229, and updates input field 201d to include the "E" and "C" characters in text-entry input field 201d displayed on virtual application 201, as shown in FIG. 2F. In some embodiments, device 100a displays the updates to text-entry field 201d on representation 221 of the trackpad. For example, as shown in FIG. 2F, the letters "DEC" are shown in projection 201d' of the text-entry input field.

FIG. 3 depicts an exemplary technique 300 for displaying representations of physical input devices and overlaying visual features on the representations of the physical input devices in a CGR environment. In some embodiments, the technique is carried out by system 100 described in reference to FIGS. 1A-1B and 2A-2F.

The device (e.g., 100a) displays an application (e.g., virtual application) (e.g., 201) (e.g., a web browser, PDF, messaging application, etc.) in a CGR environment. In some embodiments, the application is displayed by projecting the application onto a representation of a physical surface in the CGR environment, or projecting the application onto a virtual surface in the CGR environment.

At block 304, in response to detecting an input field (e.g., a text input field (201d), a data (e.g., digital signature) entry field (201c), a radio button (201a, 201b)) in the displayed application, the device (e.g., 100a) displays (e.g., projects) at least a portion (e.g., 201') of the displayed application (e.g., 201) on a representation (e.g., 221) of a physical input device (e.g., 210), the portion of the displayed application including the detected input field (e.g., 201a', 201b', 201c', 201d'). In some embodiments, the physical input device is a trackpad (e.g., 210), or other physical (e.g., not virtual), touch-sensitive surface that does not include a display component and is separate and apart (e.g., external) from both the electronic device (e.g., 100a) for viewing/displaying the CGR environment and a surface (e.g., tabletop 212) upon which the virtual application is originally displayed.

In some embodiments, the technique further comprises the device (e.g., 100a), in response to detecting the input field (e.g., 201a, 201b, 201c, 201d) in the displayed application (e.g., 201), displaying, on the representation (e.g., 221) of the physical input device, virtual keyboard keys (e.g., 229). In some embodiments, a virtual keyboard (e.g., a soft keyboard) is displayed/projected onto the representation of the physical input device in addition to the portion (e.g., 201') of the displayed application and included input field (e.g., 201d') as shown in FIG. 2F. In some embodiments, the virtual keyboard is displayed/projected onto the representation of the physical input device in lieu of the virtual input field or in lieu of the displayed application.

In some embodiments, the input includes a touch input (e.g. 219A-219C) at a location on the physical input device (e.g., 210) corresponding to a displayed location of a virtual keyboard key. In some embodiments, such as that shown in FIGS. 2E and 2F, the projection of an input field (e.g., 201d') is displayed with a virtual keyboard (e.g., soft keyboard 229) having one or more virtual keys, and the input includes a user touch at a location on the physical input device that corresponds to a location at which one or more of the virtual keys is displayed. In some embodiments, the virtual keyboard keys are displayed in accordance with a determination that the detected input field is a text-entry field (e.g., 201d). In some embodiments, the physical input device is a physical keyboard with physical keyboard keys, and respective displayed keyboard keys have a different value than the physical keyboard keys upon which they are displayed (e.g., the physical keyboard keys include a subset of keys that correspond to a number keypad, and the displayed keys are displayed as edit functions (e.g., a copy command, a paste command, etc.) that are displayed over the keys for the number keypad).

In some embodiments, the physical input device is a touch-sensitive surface (e.g., a trackpad 210). In some embodiments, the touch-sensitive surface does not include a display component (e.g., a display screen or a touchscreen display). In some embodiments, the physical input device (e.g., 210) is external to the electronic device (e.g., 100a).

In some embodiments, projecting the at least a portion (e.g., 201') of the displayed application onto the representation (e.g., 221) of the physical input device (e.g., 210) includes displaying, in the CGR environment, a projection of the detected input field (e.g., 201a', 201b', 201c', 201d') positioned (e.g., overlaid) on the representation of the physical input device.

In some embodiments, the technique further comprises the device (e.g., 100a), in accordance with a determination that the detected input field is a text-entry field (e.g., 201d), displaying the at least a portion (e.g., 201') of the displayed application on the representation (e.g., 221) of the physical input device includes displaying, in the CGR environment, a virtual text box (e.g., 201d') positioned (e.g., overlaid) on the representation of the physical input device.

In some embodiments, the technique further comprises the device (e.g., 100a), in accordance with a determination that the detected input field is a digital signature field (e.g., 201c), displaying the at least a portion (e.g., 201') of the displayed application on the representation (e.g., 221) of the physical input device includes displaying, in the CGR environment, a virtual digital signature box (e.g., 201c') positioned (e.g., overlaid) on the representation of the physical input device.

In some embodiments, the technique further comprises the device (e.g., 100a), in accordance with a determination that the detected input field includes one or more radio buttons (e.g., 201a, 201b), displaying the at least a portion (e.g., 201') of the displayed application on the representation (e.g., 221) of the physical input device includes displaying, in the CGR environment, one or more virtual radio buttons (e.g., 201a', 201b') positioned (e.g., overlaid) on the representation of the physical input device. In some embodiments, displaying the at least a portion of the displayed application on the representation of the physical input device further includes displaying, in the CGR environment, text associated with the one or more radio buttons of the detected input field.

At block 306, in response to detecting an input (e.g., 215, 217, 219A-219C) received at the physical input device (e.g., 210), the device (100a) updates the input field (e.g., 201a, 201b, 201c, 201d) with the input. For example, the electronic device detects that a user swipe gesture or touch gesture was received at a trackpad (e.g., 210) or other physical (e.g., not virtual), touch-sensitive surface that does not include a display component and is external from both the electronic device for viewing/displaying the CGR environment and the surface (e.g., 212) upon which the virtual application is originally displayed. The electronic device receives input data indicative of the input at the physical input device, and uses the input data to update the input field.

In some embodiments, the input (e.g., 215, 217, 219A-219C) includes a touch input at a location on the physical input device (e.g., 210) corresponding to a location of the projection of the input field (e.g., 201a', 201b', 201c, 201d') displayed on the representation (e.g., 221) of the physical input device. In some embodiments, the projected input field is a virtual text box (e.g., text entry field 201d') displayed on the representation of the physical input device, and the input includes a user touch at a location on the physical input device, in the real environment, that corresponds to a location at which the virtual text box is displayed in the CGR environment (e.g., to position a text-entry cursor). In some embodiments, the projected input field is a virtual digital signature box (e.g., 201c') displayed on the representation of the physical input device, and the input includes a user touch (e.g., 217) at a location on the physical input device, in the real environment, that corresponds to a location at which the virtual digital signature box is displayed in the CGR environment. In some embodiments, the projected input field includes one or more virtual radio buttons (e.g., 201a', 201b') displayed on the physical input device, and the input includes a user touch (e.g., 215) at a location on the physical input device, in the real environment, that corresponds to a location at which the one or more virtual radio buttons are displayed in the CGR environment. In some embodiments, the touch input has an intensity component. In some embodiments, the touch input is a swipe on the physical input device.

In some embodiments, the technique further includes the device (e.g., 100a), in response to detecting the input (e.g., 215, 217, 219A-219C) received at the physical input device (e.g., 210), generating a haptic feedback. For example, the device communicates (e.g., using communication bus(es) 150) with the input device to provide a physical feedback such as a vibration. In some embodiments, the haptic feedback mimics a clicking response such as when clicking a mouse button, a button on a trackpad, or a key on a keyboard. In some embodiments, the haptic feedback includes an auditory feedback such as a clicking sound.

In some embodiments, the device (e.g., 100a) updating the input field with the input comprises receiving input data indicative of the input (e.g., 215, 217, 219A-219C) at the physical input device (e.g., 210), and updating the input field (e.g., 201a, 201b, 201c, 201d) in accordance with the received input data.

At block 308, the device (e.g., 100a) displays the updated input field (e.g., 201a, 201b, 201c, 201d). In some embodiments, the updated input field is displayed in the application (e.g., 201a, 201c, 201d as shown in FIG. 2F). In some embodiments, the updated input field is displayed in the projection (e.g., 201a', 201b', 201c', 201d') of the input field displayed on the representation (e.g., 221) of the physical input device (e.g., 210). In some embodiments, the updated input field is displayed in both the application and the projected input field displayed in the portion (e.g., 201') of the application projected onto the representation of the physical input device.

In some embodiments, displaying the updated input field comprises displaying the updated input field in the application (e.g., 201). For example, the input field (e.g., 201a, 201b, 201c, 201d) displayed in the displayed application is updated to include the input from the user. In some embodiments, the updated input field is displayed as a text box (e.g., 201d) having text entered by the user (e.g., as shown in FIG. 2F). In some embodiments, the updated input field is displayed as a digital signature box (e.g., 201c) having text (e.g., a digital signature 227) entered by the user. In some embodiments, the updated input field is displayed as one or more radio buttons (e.g., 201a) selected by the user.

In some embodiments, displaying the updated input field comprises displaying the updated input field in the projection of the input field (e.g., 201a', 201b', 201c', 201d') displayed in the portion (e.g., 201') of the application projected onto the representation (e.g., 221) of the physical input device (e.g., 210). For example, the projection of the input field that is displayed/projected onto the representation of the physical input device is updated to include the input from the user. In some embodiments, the updated input field is displayed as a representation of a text box (e.g., 201d') having text entered by the user (e.g., as shown in FIG. 2F). In some embodiments, the updated input field is displayed as a representation of a digital signature box (e.g., 201c') having text (e.g., a digital signature) entered by the user. In some embodiments, the updated input field is displayed as one or more radio buttons (e.g., 201a') selected by the user.

Figure 4A:
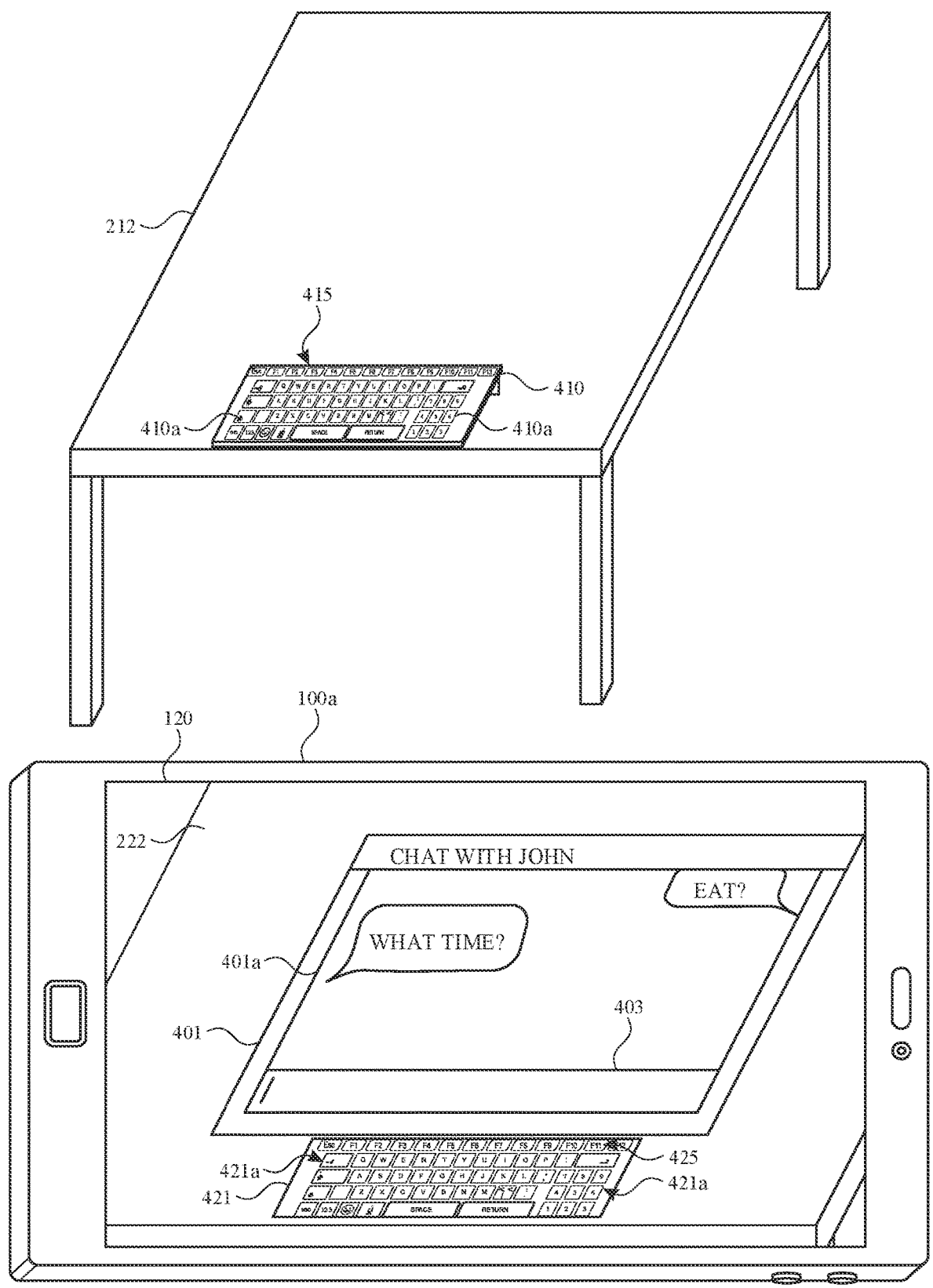
FIGS. 4A-4B illustrate a device displaying representations of physical input devices and overlaying visual features on the representations of the physical input devices in a CGR environment.
Figure 4B:
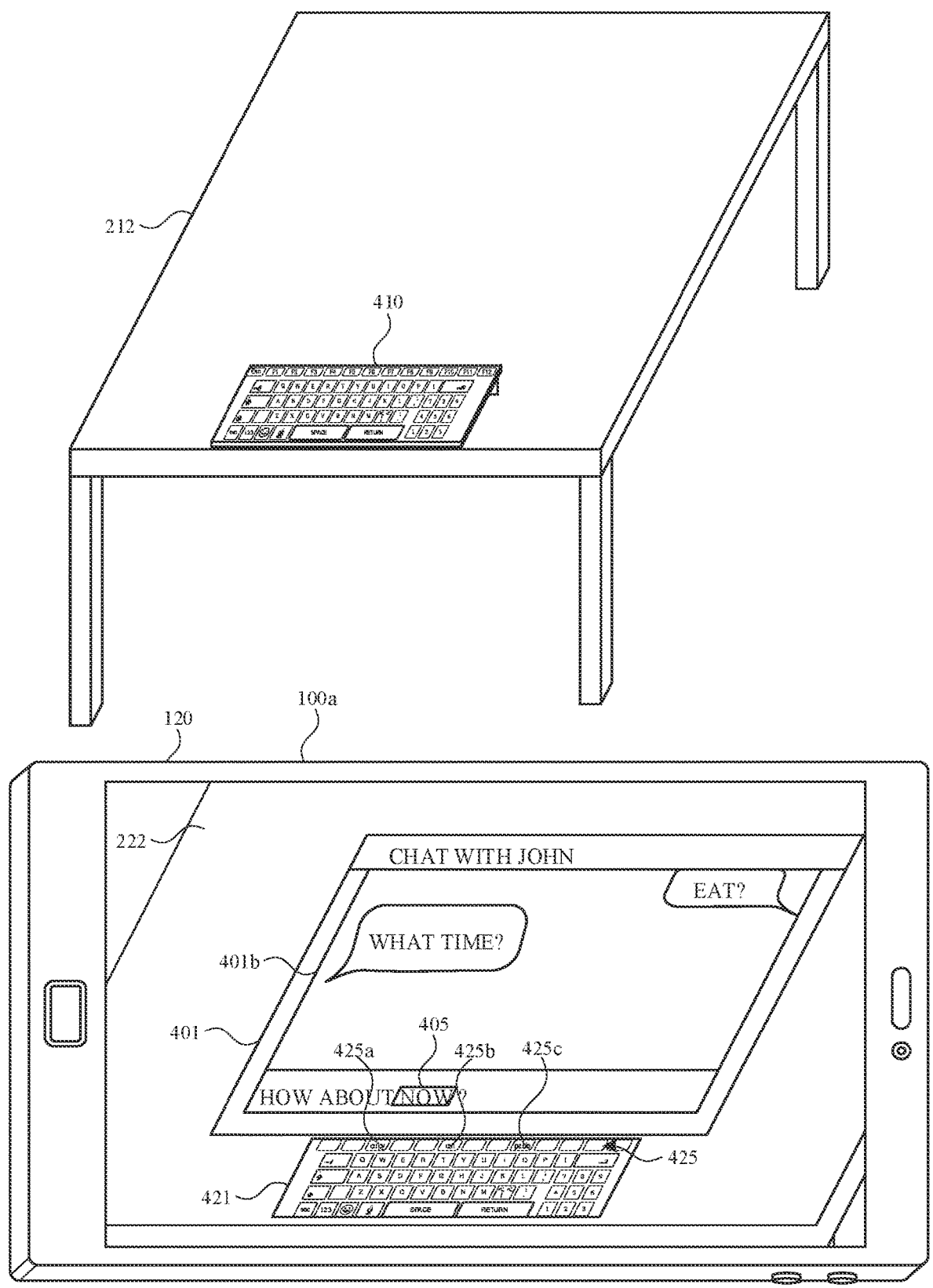

As illustrated in FIGS. 4A-4B, device 100a detects (e.g., using image sensor(s) 108) physical input device 410 (e.g., a keyboard having keys (including function keys 415)) positioned on physical tabletop surface 212 and displays, on display 120, representation 421 of the physical input device positioned on representation 222 of the physical tabletop surface. Representation 421 of the physical input device has a same position with respect to representation 222 of the physical tabletop surface as the position of physical input device 410 with respect to physical tabletop surface 212. Furthermore, representation 421 of keyboard 410 includes representation 421a of all the keys on keyboard 410 (including representation 425 of function keys 415 and a representation of number keys), each representation 421a of each keyboard key having a same position with respect to representation 421 of the keyboard as the position of a corresponding physical key with respect to physical keyboard 410.

Device 100a also displays virtual application 401 having first state 401a. Device 100a determines a first set of input controls that are specific to current (first) state 401a of the virtual application, and projects the first set of input controls onto representation 421 of the physical input device. In response to detecting second state 401b of the virtual application (e.g., an update to the first state of the virtual application or a different application altogether), device 100a determines a second set of input controls that are specific to second state 401b of the virtual application, and projects the second set of input controls onto representation 421 of the physical input device.

In some embodiments, the physical input devices (e.g., trackpad 210, keyboard 410) are external to device 100a (e.g., separate from device 100a) and, in the real environment, do not comprise a display component such as, for example, a touchscreen display. As such, device 100a is capable of transforming the physical input device, in the CGR environment, into a representation of the physical input device, but with added display capabilities that are lacking from the physical device in the real environment. Device 100a can also augment functionality of the physical input device in the CGR environment by associating virtual features (e.g., input functions or input controls) with the representation of the physical input device. For example, a physical keyboard having a key (e.g., number key 9) that, in the real environment, is programmed to enter a number can be reconfigured by device 100a in the CGR environment by associating a different function (e.g., a copy or paste command when the computer application is a word processing application, for example) with the key. Furthermore, device 100a displays, on a representation of the keyboard key in the CGR environment, a virtual representation of the customized function (e.g., a copy or paste icon displayed on the representation of the keyboard key). Accordingly, device 100a enhances operation of system 100 by customizing the functionality of the physical input devices, in the CGR environment, through generating and displaying virtual features and associating those virtual features with the physical input devices in a manner that is customized to the specific application displayed in the CGR environment. By augmenting the physical input device to customize its functionality in the CGR environment, device 100a presents a user with customized control options for interfacing with the computer application (e.g., 401) without cluttering the CGR environment with additional displayed control options (e.g., menu options, etc.). This enhances operability of device 100a and makes the user-device interface more efficient (e.g., by helping the user to provide proper inputs and reducing user mistakes when operating/interfacing with the augmented physical input device) which, additionally, reduces power usage and improves battery life of device 100a by enabling the user to use device 100a more quickly and efficiently.

Referring now to FIG. 4A, device 100a detects (e.g., using image sensor(s) 108), physical keyboard 410 positioned on physical tabletop surface 212 in the real environment. Keyboard 410 is a physical input device in the real environment that has user-input capabilities (e.g., provided by keyboard keys 410a and function keys 415), but lacks a display component and any display capabilities. Device 100a displays, in the CGR environment shown on display 120, representation 222 of tabletop surface 212, representation 421 of keyboard 410 positioned on representation 222 of the tabletop surface, and virtual application 401 projected onto representation 222 of the tabletop surface. In some embodiments, such as that shown in FIGS. 4A-4B, device 100a projects virtual application 401 onto a representation of a physical surface, such as a wall or the tabletop surface, in the CGR environment. In some embodiments, device 100a projects virtual application 401 onto a virtual surface so that virtual application 401 appears, for example, to be floating in the CGR environment.

As shown in FIG. 4A, virtual application 401 is a messaging application shown in first state 401a having text-entry field 403 for entering text. Device 100a is configured to determine a set of input controls that are specific to the state of the virtual application. Accordingly, device 100a determines that current state 401a of virtual application 401 is for entering/receiving text in text-entry field 403. In response to this determination, device 100a determines a set of input functions (e.g., commands or data) that correspond to entering/receiving text, and displays a virtual representation of those input functions on representation 421 of the keyboard in the CGR environment. For example, device 100a determines that the set of input functions for current text-entry state 401a include entering numbers, letters, and punctuation into text-entry field 403, but not edit operations such as a copy, cut, or paste operation. Therefore, in FIG. 4A, device 100a displays a virtual letter, number, or punctuation mark on each of the respective representations 421a of keyboard keys (including the number keypad), but does not display a representation of any unnecessary input functions such as those, for example, associated with edit operations. As such, device 100a determines that any input functions associated with representations 425 of each function key is irrelevant and, therefore, displays each representation 425 of a function key as blank (e.g., by omitting from the displayed representations 425 any indicia that is present on the physical keyboard keys, or by displaying a virtual feature that obscures the representation of the keyboard key so that it appears blank), indicating that representations 425 of function keys are inactive for current state 401a of the application. In this way, device 100a customizes the functionality provided by the physical input device such that only desired or necessary input functions are presented to the user for interfacing with the current state (e.g., 401a) of virtual application 401.

Device 100a modifies functionality provided by physical keyboard 410 by associating the functionality of the displayed representation 421 of the keyboard with the physical keyboard 410 such that the physical keyboard keys activated by a user, in the real environment, provide the input (if any) associated with the representation of that respective key in the CGR environment. For example, if a user activates the physical keyboard key corresponding to the letter "H" in the real environment, device 100a executes the input function associated with that key in the CGR environment. In accordance with the example in FIG. 4A, device 100a will interpret the input from the physical keyboard 410 as the letter "H," because representations 421a of the letter keys of representation 421 of the keyboard correspond to the keys of physical keyboard 410. Similarly, if the user activates the physical keyboard key corresponding to one of the function keys 415, device 100a will ignore that input because representations 425 of the function keys are inactive in the CGR environment. Although, in this example, the representation of the letter "H," in the CGR environment, corresponds to the "H" keyboard key in the real environment, it should be understood that the input functions associated with the representations of keyboard keys may be any desired input functions, and not just those corresponding to keys of physical keyboard 410. For example, device 100a could configure the input functions such that the "H" key of physical keyboard 410 corresponds to an input function of entering the letter "Q" in the CGR environment. As another example, device 100a could configure the input functions such that the "H" key of physical keyboard 410 corresponds to an input function of performing a copy or paste command as discussed in greater detail below.

Referring now to FIG. 4B, device 100a detects second state 401b of virtual application 401, in which the text "now" is selected 405. Device 100a determines a set of input functions that correspond to commands to be performed when text is selected and displays a virtual representation of those input functions on representation 421 of the keyboard in the CGR environment. For example, device 100a determines that the set of input functions for current text-selected state 401b of the application includes entering numbers, letters, punctuations, and various editing operations including copy, cut, and paste operations. Therefore, in FIG. 4B, device 100a displays a virtual letter, number, or punctuation mark on each of respective representations 421a of keyboard keys (including the number keypad), and updates selected ones of representations 425 of function keys to display a virtual representation 425a, 425b, 425c of a copy, cut, or paste operation, respectively. In this way, device 100a modifies the virtual features displayed on (and associated with) representation 421 of the physical input device (e.g., keyboard 410).

Although the embodiment illustrated in FIGS. 4A and 4B shows device 100a determining different sets of input controls based on detecting different states 401a and 401b of a single virtual application (application 401), it should be appreciated that such determinations may be made based on detecting a different application altogether. For example, device 100a may determine a first set of input controls for interfacing with a first application (e.g., a web browser application) and, in response to detecting the virtual application changing to a second application different from the first application (e.g., a photo editing application), determine a second set of input controls for interacting with the second application. It should also be understood that the input controls determined by device 100a are not limited to those disclosed herein, but can include any computer-executable instructions for interfacing with the current state of the virtual application, so long as those instructions are relevant to the current state of the virtual application.

Figure 5:
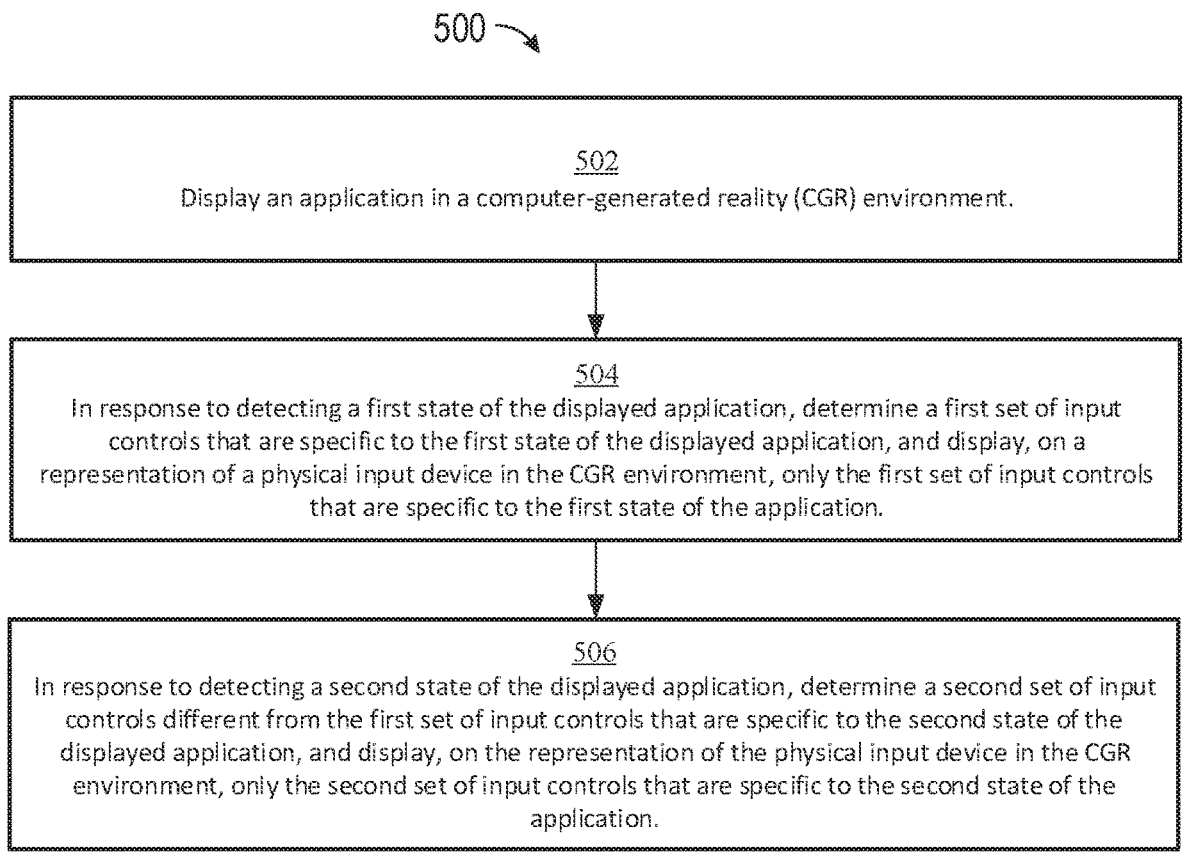
FIG. 5 depicts an exemplary technique for displaying representations of physical input devices and overlaying visual features on the representations of the physical input devices in a CGR environment.

FIG. 5 depicts an exemplary technique 500 for displaying representations of physical input devices and overlaying visual features on the representations of the physical input devices in a CGR environment (e.g., augmented reality, virtual reality). In some embodiments, the technique is carried out by system 100 described in reference to FIGS. 1A-1B and 4A-4B.

At block 502, the device (e.g., 100a) displays an application (e.g., a virtual application (e.g., 401)) (e.g., a web browser, PDF, messaging application, photo editing application, etc.) in a CGR environment. In some embodiments, the application is displayed by projecting the virtual application onto a representation of a physical surface in the CGR environment, or projecting the virtual application onto a virtual surface in the CGR environment.

At block 504, in response to detecting a first state (e.g., 401a) of the displayed application (e.g., 401), the device (e.g., 100a) determines a first set of input controls (e.g., numbers, letters, punctuation) that are specific to the first state of the displayed application and displays, on a representation (e.g., 421) of a physical input device (e.g., 410) in the CGR environment, only the first set of input controls that are specific to the first state of the application. An example of such an embodiment is illustrated in FIG. 4A, wherein the device 100a determines that the set of input functions for a text-entry state 401a include entering numbers, letters, and punctuation into the text-entry field 403, but not edit operations such as a copy, cut, or paste operation.

At block 506, in response to detecting a second state (e.g., 401b) of the displayed application (e.g., 401), the device (e.g., 100a) determines a second set of input controls different from the first set of input controls (e.g., numbers, letters, punctuation, edit operations such as cut, copy, and paste operations) that are specific to the second state of the displayed application and displays, on the representation (e.g., 421) of the physical input device (e.g., 410) in the CGR environment, only the second set of input controls that are specific to the second state of the application. An example of such an embodiment is illustrated in FIG. 4B, wherein the device 100a determines that the set of input functions for a text-selected state 401b of the application includes entering numbers, letters, punctuations, and various editing operations including copy, cut, and paste operations.

In some embodiments, the physical input device is a keyboard (e.g., 410), and the representation (e.g., 421) of the keyboard in the CGR environment includes a representation of the keyboard including representations of keyboard keys (e.g., 421a, 425) corresponding to the locations of the physical keys (e.g., 410a, 415) on the keyboard in the real environment. In some embodiments, the device 100a, in response to detecting the activation of a physical key of the keyboard in the real environment, executes a command associated with a representation of a keyboard key in the CGR environment that corresponds to the activated physical key in the real environment.

In some embodiments, the device (e.g., 100a) updates the displayed set of control functions displayed on the representation (e.g., 421) of the keyboard, in the CGR environment, in response to detecting a switch from a first application (e.g., a first virtual application) to a second application (e.g., a second virtual application). In some embodiments, the first application is a web browser application and the first set of input controls are web browser controls (e.g., next page, previous page, load, stop, refresh, etc.). In some embodiments, the second application is a photo editing application and the second set of input controls are editing controls (e.g., enhance, cut, paste, insert, select, etc.).

While the present disclosure has been shown and described with reference to the embodiments provided herein, it will be understood by those skilled in the art that various changes in form and details may be made without departing from the scope of the present disclosure.

What is claimed is:

1. An electronic device, comprising:
   a display;
   one or more processors; and
   memory storing one or more programs configured to be executed by the one or more processors, the one or more programs including instructions for:

presenting, via the display, a user interface for a virtual application;
presenting, via the display, a representation of a physical input device, wherein the user interface for the virtual application is displayed concurrently with the representation of the physical input device; and
while presenting the user interface for the virtual application:
detecting an application state corresponding to the user interface for the virtual application; and
in response to detecting the application state:
in accordance with a determination that the application state corresponds to a first application state, presenting a first set of input controls overlaid on the representation of the physical input device; and
in accordance with a determination that the user interface for the virtual application is in a second application state, different from the first application state, presenting a second set of input controls overlaid on the representation of the physical input device, wherein the second set of input controls is different from the first set of input controls.

2. The electronic device of claim 1, wherein the physical input device does not include a display component.

3. The electronic device of claim 1, wherein the presented respective set of input controls are based on a context of the virtual application.

4. The electronic device of claim 1, wherein the physical input device includes a third set of input controls that is different from the presented respective set of input controls.

5. The electronic device of claim 1, the one or more programs further including instructions for:
while presenting the respective set of input controls, detecting an input directed to a key on the physical input device;
in response to detecting the input directed to the key on the physical input device:
in accordance with a determination that a first function of the key on the physical input device corresponds to the first function of a key at a corresponding location on the representation of the physical input device, performing the first function; and
in accordance with a determination that the first function of the key on the physical input device does not correspond to the first function of a key at the corresponding location on the representation of the physical input device, forgoing performing the first function.

6. The electronic device of claim 1, the one or more programs further including instructions for:
while presenting the respective set of input controls, detecting an input directed to a key on the physical input device, wherein the key corresponds to a second function; and
in response to detecting the input directed to the key on the physical input device, performing a third function, different from the second function.

7. A non-transitory computer-readable storage medium storing one or more programs configured to be executed by one or more processors of an electronic device with a display, the one or more programs including instructions for:
presenting, via the display, a user interface for a virtual application;
presenting, via the display, a representation of a physical input device, wherein the user interface for the virtual application is displayed concurrently with the representation of the physical input device; and
while presenting the user interface for the virtual application:
detecting an application state corresponding to the user interface for the virtual application; and
in response to detecting the application state:
in accordance with a determination that the application state corresponds to a first application state, presenting a first set of input controls overlaid on the representation of the physical input device; and
in accordance with a determination that the user interface for the virtual application is in a second application state, different from the first application state, presenting a second set of input controls overlaid on the representation of the physical input device, wherein the second set of input controls is different from the first set of input controls.

8. The non-transitory computer-readable storage medium of claim 7, wherein the physical input device does not include a display component.

9. The non-transitory computer-readable storage medium of claim 7, wherein the presented respective set of input controls are based on a context of the virtual application.

10. The non-transitory computer-readable storage medium of claim 7, wherein the physical input device includes a third set of input controls that is different from the presented respective set of input controls.

11. The non-transitory computer-readable storage medium of claim 7, the one or more programs further including instructions for:
while presenting the respective set of input controls, detecting an input directed to a key on the physical input device;
in response to detecting the input directed to the key on the physical input device:
in accordance with a determination that a first function of the key on the physical input device corresponds to the first function of a key at a corresponding location on the representation of the physical input device, performing the first function; and
in accordance with a determination that the first function of the key on the physical input device does not correspond to the first function of a key at the corresponding location on the representation of the physical input device, forgoing performing the first function.

12. The non-transitory computer-readable storage medium of claim 7, the one or more programs further including instructions for:
while presenting the respective set of input controls, detecting an input directed to a key on the physical input device, wherein the key corresponds to a second function; and
in response to detecting the input directed to the key on the physical input device, performing a third function, different from the second function.

13. A method, comprising:
at an electronic device having a display:
presenting, via the display, a user interface for a virtual application;
presenting, via the display, a representation of a physical input device, wherein the user interface for the virtual application is displayed concurrently with the representation of the physical input device; and while presenting the user interface for the virtual application:
  detecting an application state corresponding to the user interface for the virtual application; and
  in response to detecting the application state:
    in accordance with a determination that the application state corresponds to a first application state, presenting a first set of input controls overlaid on the representation of the physical input device; and
    in accordance with a determination that the user interface for the virtual application is in a second application state, different from the first application state, presenting a second set of input controls overlaid on the representation of the physical input device, wherein the second set of input controls is different from the first set of input controls.

14. The method of claim 13, wherein the physical input device does not include a display component.

15. The method of claim 13, wherein the presented respective set of input controls are based on a context of the virtual application.

16. The method of claim 13, wherein the physical input device includes a third set of input controls that is different from the presented respective set of input controls.

17. The method of claim 13, further comprising:
while presenting the respective set of input controls, detecting an input directed to a key on the physical input device;
in response to detecting the input directed to the key on the physical input device:
  in accordance with a determination that a first function of the key on the physical input device corresponds to the first function of a key at a corresponding location on the representation of the physical input device, performing the first function; and
  in accordance with a determination that the first function of the key on the physical input device does not correspond to the first function of a key at the corresponding location on the representation of the physical input device, forgoing performing the first function.

18. The method of claim 13, further comprising:
while presenting the respective set of input controls, detecting an input directed to a key on the physical input device, wherein the key corresponds to a second function; and
in response to detecting the input directed to the key on the physical input device, performing a third function, different from the second function.

* * * * *